United States Patent

Kelling

[15] 3,686,547

[45] Aug. 22, 1972

[54] NUMERICAL FINE-COARSE POSITIONING CONTROL SYSTEM

[72] Inventor: Leroy U. C. Kelling, Waynesboro, Va.

[73] Assignee: General Electric Company

[22] Filed: Oct. 21, 1969

[21] Appl. No.: 868,124

[52] U.S. Cl. .................318/594, 318/595, 318/603, 318/608
[51] Int. Cl. .............................................G05b 11/18
[58] Field of Search......318/594, 601, 603, 604, 602, 318/608, 595

[56] References Cited

UNITED STATES PATENTS

| | | |
|---|---|---|
| 2,928,033 | 3/1960 | Abbott ................318/20.330 |
| 2,947,929 | 7/1960 | Bower...............318/20.320 X |
| 2,983,872 | 5/1961 | Williamson et al...318/20.370 |
| 3,160,803 | 12/1964 | White...................318/20.370 |
| 3,320,501 | 5/1967 | Davies..............318/20.370 X |
| 3,374,359 | 3/1968 | Anderson .........318/20.320 X |

Primary Examiner—T. E. Lynch
Attorney—Frank L. Neuhauser, Oscar B. Waddell, Joseph B. Forman and William S. Wolfe

[57] ABSTRACT

A numerical positioning control system using a single feedback transducer which is coupled to the controlled machine axis. The transducer has a relatively small scale factor, substantially less than the total amount of travel of the controlled machine tool axis, and is monitored by a cycle control unit which generates output signals so as to control the phase of a phase varying means such as a variable phase digital counter. The output of the variable phase digital counter then represents a second phase varying signal which has a scale factor larger than the scale factor of the feedback transducer. Input data is fed into the system and is used to vary the phase of digital counters which are then phase compared with the phases of the feedback transducer and the phase varying means. The results of these comparisons are used to control the driving means which ultimately operate to move the controlled machine axis in a direction and at a speed related to the difference between the actual position of the controlled machine axis and the desired position as indicated by the input data.

13 Claims, 11 Drawing Figures

INVENTOR.
LEROY U.C. KELLING
BY Michael Masnik
HIS ATTORNEY

Patented Aug. 22, 1972

INVENTOR.
LEROY U.C. KELLING
BY Michael Masnik
HIS ATTORNEY

Patented Aug. 22, 1972

INVENTOR.
LEROY U.C. KELLING
BY Michael Masnik
HIS ATTORNEY

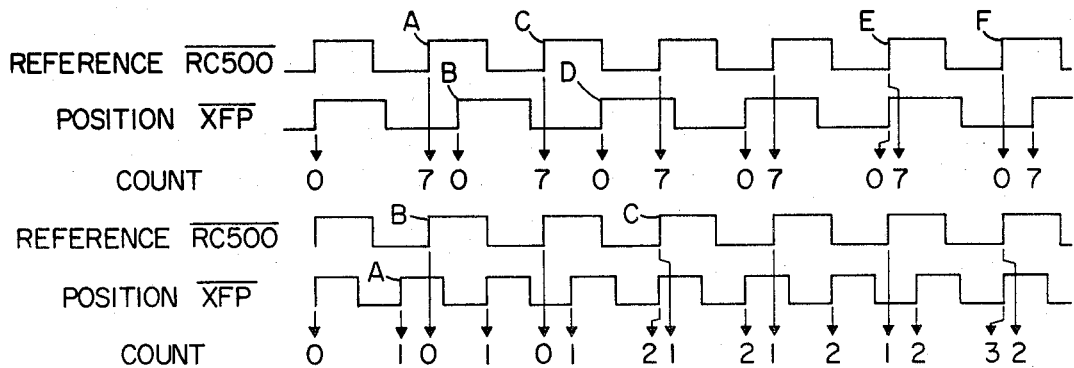
FIG. 5(a)
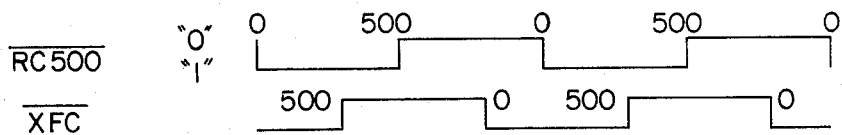
(LAST THREE DIGITS OF COMMANDED POSITION = 200)
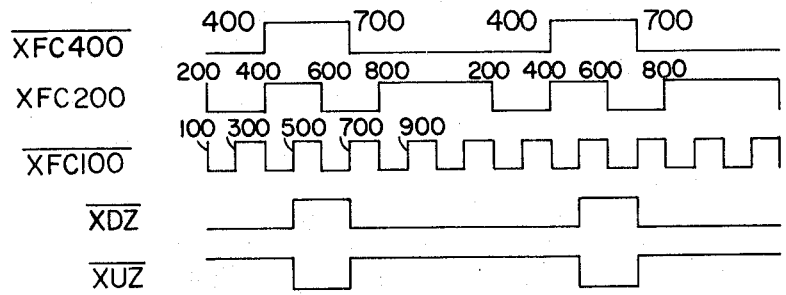
FIG. 5(b)
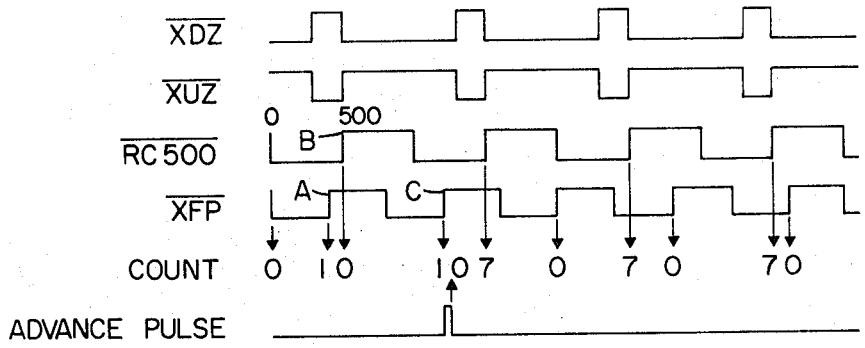
FIG. 5(c)

INVENTOR.
LEROY U.C. KELLING
BY Michael Masnik
HIS ATTORNEY

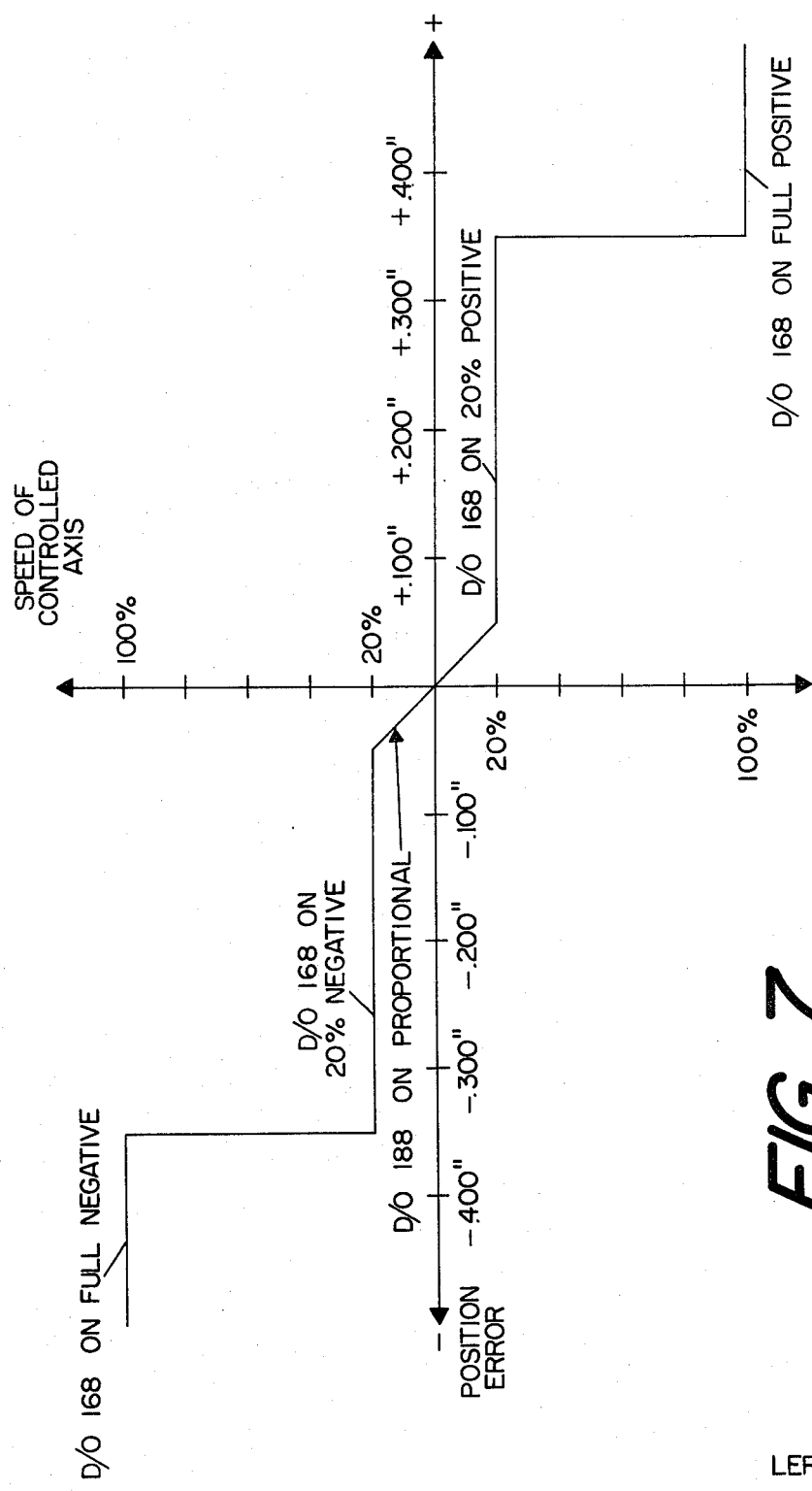

NUMERICAL FINE-COARSE POSITIONING CONTROL SYSTEM

BACKGROUND OF THE INVENTION

The present invention relates to electronic control systems. More specifically, the present invention relates to a numerical positioning control system for controlling the position of the movable elements of a machine, particularly a machine tool.

Briefly stated, a numerical positioning control is an electronic control system capable of responding to input data indicating the desired position of one or more movable elements of a machine. Such control systems are particularly useful when applied to machine tools such as drills, boring mills, etc. and are used to control the movable axes of such machine tools so as to carry out the necessary machining operations with little or no intervention by the individual operating the machine tool.

A number of prior art types of numerical positioning controls are known. One of the earliest types of such a control system used stepping switches, relays, and phase shifting transformers which operated to control the phase of a plurality of electromagnetic resolvers which were mechanically connected to the various machine axes. The phase at which the particular resolvers were excited was shifted in accordance with the input data and the control system then proceeded to null the output of each resolver.

A more advanced system of numerical positioning control became possible with the advent of solid state devices such as transistors which made digital control systems possible at reasonable cost and efficiency. One of the better known types of solid state digital numerical positioning control systems is illustrated in block diagram form in FIG. 1 which will be described in some detail hereinafter. Briefly, this type of control system utilizes a plurality of resolvers which are variously geared to the controlled machine element. These resolvers are excited by a constant polyphase signal and their varying phase output signal is then compared with a phase varying signal which is representative of the desired position as indicated by the input data.

A still further approach is illustrated in FIG. 2 (discussed in detail hereinafter) which uses only a single feedback device coupled to the controlled machine axis. The single feedback device is capable of representing the position of the machine axis over a limited range and the control system includes a static storage register which operates in response to the output of the single feedback device to maintain information relative to the present position of the machine in units which exceed the basic resolution capabilities of the feedback device itself.

Finally, a still further approach to numerical positioning control utilizes a circulating storage serial data processing approach. This numerical positioning control system is illustrated by U.S. Pat. Application Ser. No. 709,242, filed Feb. 29, 1968, in the names of J. P. Corbett and Leroy U. C. Kelling and assigned to the assignee of the present invention. In this type of control system, the data is stored on a circulating storage system such as a delay line as opposed to the parallel, static storage systems of the above referred to prior art systems.

While each of these prior art systems has been successful, there remains the need for a numerical positioning control system which has some of the advantages of each of these prior art systems and is relatively simple in operation, inexpensive, and of sufficient versatility to adapt itself readily to a variety of machine applications without extensive special hardware and/or engineering.

SUMMARY OF THE INVENTION

It is an object of the present invention to provide a novel numerical positioning control system which is relatively simple in operation and inexpensive to build and maintain.

It is a further object of the present invention to provide a novel numerical positioning control system which requires only a single feedback transducer having a scale factor which covers only a small portion of the total travel capabilities of the average controlled machine axis.

It is a still further object of the present invention to provide a novel numerical positioning control system which takes phase varying output of a single position transducer having a first scale factor and generates a second phase varying signal having a larger scale factor.

It is a still further object of the present invention to provide a novel numerical positioning control system including a cycle control unit which examines the phase varying output of a single position transducer and indicates when the position transducer has completed a predetermined amount of travel.

It is a still further object of the present invention to provide a novel numerical positioning control system including a novel discriminator system which generates an output signal representative of the position error of the control axis by examining the relative phase of the second phase varying signal and the phase varying output of the single position transducer.

It is a still further object of the present invention to provide a novel numerical positioning control system including a novel phase discriminator which generates an output signal indicative of the phase difference between two phase varying signals whose basic frequencies have been divided so as to provide for overlap therebetween.

Briefly stated, the present invention contemplates a novel numerical positioning control system using a single feedback transducer having a relatively small scale factor which is substantially less than the total amount of travel of the controlled machine tool axis. Input data is fed into two digital counters which generate phase varying signals in each of two scale factors indicative of the desired position of the controlled machine axis. The phase varying output of the position transducer is phase compared with the output of one of the digital counters. This same phase varying output is also fed to a cycle control unit which generates output signals which control the phase of a phase varying means operating in a second scale factor such as a variable phase digital counter. The output of the phase varying means is then phase compared with the phase of the other digital counter. The result of these two phase comparisons is used to control the driving means which move the controlled machine axis.

DESCRIPTION OF THE DRAWINGS

While the specification concludes with claims particularly pointing out and distinctly claiming the subject matter which is regarded as the invention, an illustration of a particular embodiment can be seen by referring to the specification in connection with the accompanying drawings in which:

FIGS. 5(a)–5(d) are waveforms which illustrate the operation of the cycle control unit of FIG. 4;

FIG. 7 is a graph showing an exemplary speed versus position error characteristic for a numerical positioning control system; and, FIG. 8 is a series of waveforms illustrating the operation of the logic diagram of FIG. 6.

DESCRIPTION OF THE PREFERRED EMBODIMENT

Figure 1:
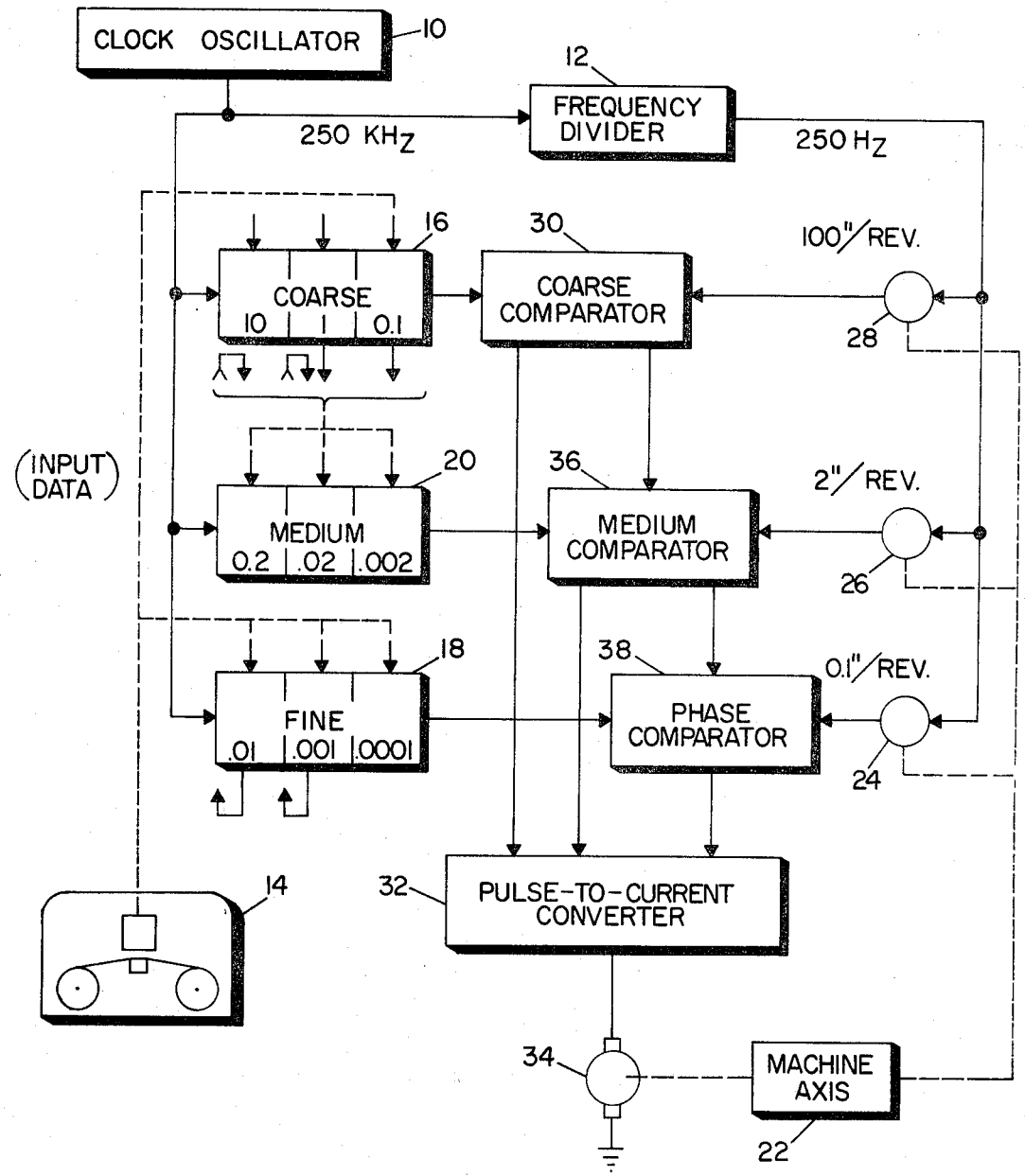
FIG. 1 is a block diagram of a positioning control system known in the prior art.

FIG. 1 is a block diagram illustrating a known prior art numerical position control system. A detailed description of a system of this type may be found, for example, in U.S. Pat. No. 3,327,101, issued to John T. Evans, and assigned to the assignee of the present invention.

The Evans system disclosed in FIG. 1 includes a clock oscillator 10 which generates a high frequency, square wave signal which forms the basic synchronizing signal for the operation of the control system. The output of the clock oscillator 10 may be, for example, 250 kHz, or any other suitable frequency which is compatible with the type of computational hardware employed and the dynamics of the particular machine being controlled. The output of the clock oscillator 10 is fed to a frequency divider 12 which divides the basic output frequency of the clock oscillator and puts out a lower frequency square wave such as the 250 Hz square wave employed in the above-cited Evans system.

Input data is supplied to the Evans control system by means of some type of input device such as a tape reader 14 which may use punched tape of the well-known type or magnetic tape on which the necessary data for commanding the operation of the machine tool is encoded.

The prior art system of FIG. 1 is illustrated by way of a single axis of a machine tool which will ordinarily have a number of controlled axes. However, for the sake of simplicity, it suffices to describe the operation of the system with respect to a single machine axis with the understanding that any number of axes can be controlled in identical fashion to the one illustrated in FIG. 1. The input data which describes the desired motion of the particular axis being controlled is relayed from the tape reader 14 to a pair of digital counters 16 and 18. Assuming for the purposes of explanation that the maximum dimension which can be commanded is 99.9999 inches, it can be seen that a six digit control system will suffice. The first three most significant digits are fed to the "coarse" command phase counter 16 with the effect of the input data being to advance the phase of that particular counter by the amount of the input information. Similarly, the last three least significant digits are fed from the tape reader 14 to the "fine" command phase counter 18 so as to advance its phase by an amount equal to the input data. A third "medium" command phase counter 20 is also provided with a maximum range of 2 inches so as to fall somewhere between the range of the coarse and fine command counters. Since the scale of the "medium" command phase counter 20 is not directly available from the input data, it is necessary to take the input to the medium command phase counter 20 from the coarse command phase counter 16 and the fine command phase counter 18 as illustrated in FIG. 1.

In the above-cited numerical positioning control system, three position feedback devices such as rotary resolvers or linear transducers are connected to the controlled machine axis 22. These three position feedback devices, which will be referred to hereinafter as resolvers since resolvers are the most conventional type of position transducer used, are scaled so as to correspond to the scaling of the coarse, medium and fine command phase counters 16, 20 and 18, respectively. That is, a "fine" resolver 24 is provided and is geared to the controlled machine axis so as to go through one complete revolution for each 0.100 inch of the travel of the controlled machine axis. Similarly, the "medium" resolver 26 is geared in such a way that it goes through one complete revolution for every 2 inches of machine axis travel. Finally, the "coarse" resolver 28 is geared to the machine axis 22 so as to go through one complete revolution for every 100 inches of machine axis travel. For the purposes of this explanation, the term "scale factor" means the amount of machine travel represented by a complete revolution of the positive transducer.

As will be recalled, and as can be seen in detail by reference to the above-cited Evans patent, when a resolver type position transducer goes through a complete mechanical revolution, the effect is to shift the output frequency by a full 360°. The relationship between the rotor windings and the stator windings on the resolver determines whether the phase shift resulting from rotation in one direction takes place by advancing or retarding the output of the resolver.

As pointed out in the above-cited Evans patent, the relationship between the coarse, medium and fine command phase counters 16, 20 and 18 and the coarse, medium and fine resolvers 28, 26 and 24, are such that they can be compared with one another so as to determine the speed and direction that the controlled machine axis must travel so as to arrive at the position required by the input data from tape reader 14.

Thus, if the difference between the present position of the machine and the position indicated by the input data exceeds a certain amount, the machine will be caused to travel in a certain direction under the initial control of a coarse comparator 30 which compares the phases of the coarse command phase counter 16 with the phase of the coarse resolver 28. If the difference between these two phase signals exceeds a certain amount, the output of the coarse comparator 30 transmits a signal to a pulse-to-current converter 32. The pulse-to-current converter 32 then puts out a certain amount of current to the means for driving the machine axis 22 such as a DC motor 34. So long as the difference in the phases of the coarse command phase counter 16 and the coarse resolver 28 exceeds a certain amount, a constant current is fed to DC motor 34 so as to drive the machine axis 22 in the proper direction.

Operation continues in this fashion until the phase difference between the coarse command phase counter 16 and the coarse resolver 28 decreases to a first minimum value at which point a signal is fed from the coarse comparator 30 to a medium comparator 36 indicating that the travel from this point is to be controlled by comparing the medium command phase counter 20 and the medium resolver 26. The pulse-to-current converter 32 is now controlled by the medium comparator 36. This switching from the coarse comparator 30 to the medium comparator 36 may be accompanied by a corresponding change in the amount of current fed to the motor 34 so as to slow down the travel of the machine since it is now approaching rather closely the desired final position. Alternatively, of course, the machine may continue to travel at the same rate but this is a matter of design choice and depends in large part upon the dynamics of the particular machine axis being controlled.

Operation of the machine continues in this fashion until the medium comparator indicates that the phase difference between medium command phase counter 20 and the medium resolver 26 is such that a second minimum distance from the final position has been reached. At this point, the medium comparator transmits a signal to a phase comparator 38. The phase comparator 38 compares the phases of the fine command phase counter 18 and the fine resolver 24 and generates a signal to control a pulse-to-current converter 32. At this point, the speed of the controlled motor 34 may become proportional to the phase error between the fine command phase counter 18 and the fine resolver 24 so as to bring the speed of the machine down as the machine axis 22 approaches the final desired position. Thus, the signal from the phase comparator 38 controls the operation of the pulse-to-current converter 32 so as to decrease its output current as the machine axis 22 approaches the final desired position. When the final position (within a certain specified deadband) is reached, the current to the controlled motor 24 is discontinued and control elements within the phase comparator 38 indicate that the machine is "in position". At this point, the desired machine operation, drilling, tapping, or whatever can take place. After the completion of the desired machine operation, the control receives a further signal from the tape reader 14 which transmits new input data indicative of the next machine position desired.

The foregoing is admittedly a brief, cursory description of the complex control system detailed in the above-cited Evans patent and is intended only to briefly describe this system for the purposes of comparison with the numerical positioning control comprising the present invention. For this purpose, it is instructive to note that the salient features of the numerical positioning control system of FIG. 1 are the use of three position transducers which are phase compared with three separate phase varying signals which are indicative of the machine position desired. The advantages of this type of control system are primarily the fact that comparisons are made on a phase basis which allows for the use of relatively simple and inexpensive comparison circuitry.

Figure 2:
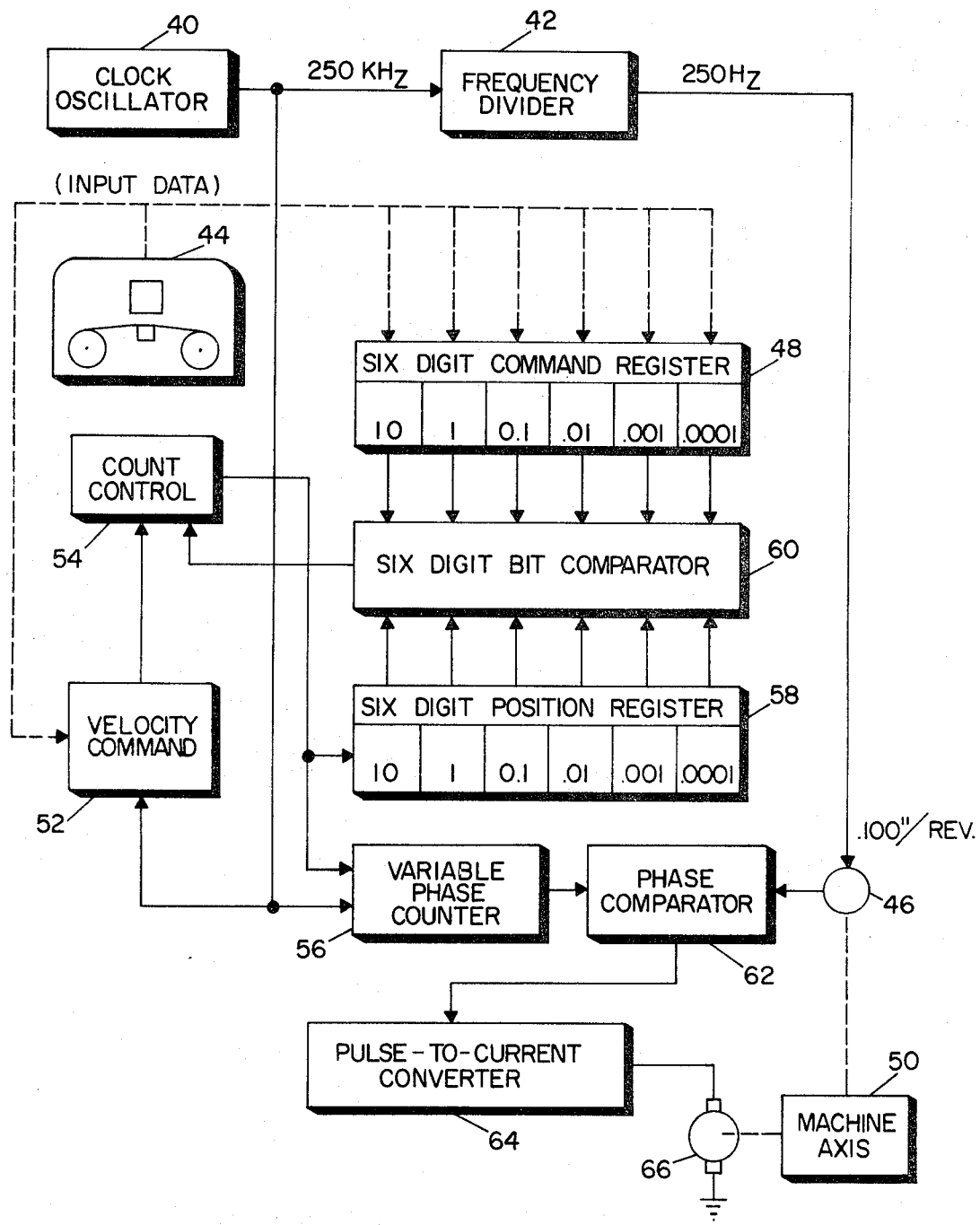
FIG. 2 is a block diagram of another positioning control system of a type known in the prior art.

FIG. 2 illustrates a second type of prior art positioning control system. This positioning control system is shown in U.S. Pat. No. 3,400,314 issued to William P. Wilson, and assigned to the assignee of the present invention. The positioning control system of FIG. 2, like the system of FIG. 1, is controlled and synchronized by a square wave signal of a fixed frequency which is fed from a clock oscillator 40 to a frequency divider 42. Like the system of FIG. 1, the frequency divider 42 operates to divide the output of the clock oscillator, say 250 kHz, so as to generate an output signal of a lower frequency, say 250 Hz. The input data to the control system comes from a tape reader 44 or other input data source as described above with respect to FIG. 1.

Instead of utilizing the three resolver approach of the system of FIG. 1, the prior art approach of FIG. 2 utilizes a single resolver 46 which has a scale factor of, for example, 0.100 inch per revolution and therefore corresponds to the fine resolver of the system of FIG. 1. It is important to note that a positioning control system of the type shown in FIG. 1 could not work with a single resolver of this low scale factor when it is desired to command positions in the range up to 99.9999 inches, since the scale of the resolver is 0.100 inch and therefore the control system would be unable to ascertain the position of the machine except within the range of the resolver scale factor.

The Wilson system of FIG. 2, however, manages to control a machine up to the distances desired by generating a digital number which is bit compared to take the place of the coarse and medium resolvers of the prior art system of FIG. 1.

Therefore, the input data from the tape reader 44 is fed to a six digit command register 48 and is held in this register in a static storage fashion. This is to be compared with the approach of the system of FIG. 1 wherein the input data was fed to command phase counters for the purpose of varying their phase relative to the reference signal generated by the clock oscillator. In addition to feeding input data indicative of the desired machine position, the numerical positioning control system of FIG. 2 can also accept input data which is indicative of the desired speed at which the controlled machine axis 50 is to be driven. This data is fed to a velocity command circuit 52 described in detail in the above-cited Wilson patent. The input data fed to the velocity command 52 is used to determine the frequency at which pulses are to be put out by a count control circuit 54. Therefore, the output of the velocity command is connected to form one of the inputs to the count control 54. The output of the count control, along with the output of the clock oscillator 40, is fed to a variable phase counter 56 so as to advance or retard the phase of this counter according to the desired direction of machine axis motion. In addition, the output of the count control 54 is also fed to a six digit position register 58 so that each time a pulse, indicative of a desired motion of 0.0001 inch is fed to the variable phase counter, this pulse is also fed to, and stored in, the six digit position register 58. In this way, the position register 58 accumulates the amount of motion of the machine since it accumulates the command pulses transmitted to the variable phase counter 56.

The contents of the six digit command register 48 are continuously compared with the contents of the six digit position register by a six digit bit comparator 60. The bit comparator 60 indicates whether the number stored in the command register is larger than the number stored in the position register or vice versa. Depending upon the state of the number stored in these two registers, the output of the bit comparator is fed to the count control 54 to determine whether the machine motion shall be in the positive or negative direction.

The single resolver 46 mounted on the machine axis 50 is excited by the reference 250 Hz frequency from the frequency divider 42. As the machine moves, the output of the resolver 46 changes phase and the instantaneous phase, relative to the reference from the frequency divider 42, out of the resolver 46 is indicative of the present machine position.

In the fashion described in detail in the above-cited Wilson patent, the output of the resolver 46 is phase compared with the output of the variable phase counter 56 by a comparator 62. The output of phase comparator 62 feeds to a pulse-to-current converter 64 and determines the quantity and polarity of current fed to the motor 66 which drives the controlled machine axis 50.

Briefly summarizing, the numerical positioning control system of FIG. 2 operates as follows. Prior to the input of new data from the tape reader 44, the numbers stored in the command register 48 and the position register 58 are identical. When new information indicative of a new position is fed from the input data source 44 to the command register 48, the numbers in these two registers are no longer the same and the output of the bit comparator 60 indicates to the count control 54 that motion of the controlled axis is necessary. The velocity command 52 puts out pulses at a rate proportional to the desired axis speed and these pulses are routed by the count control 54 to advance or retard the variable phase counter 56 and either add to or subtract from the number stored in the position register 58 depending upon whether the desired motion of the machine axis is positive or negative.

As the phase of the variable phase counter 56 changes, the phase comparator 62 will indicate a difference between the phase of variable phase counter 56 and the resolver 46 and will cause the pulse-to-current converter to feed current to the motor 66 so as to move the machine axis 50 in the appropriate direction. Operation continues in this fashion until finally the number stored in the six digit position register 58 is the same as the number stored in the six digit command register 48 at which time the six digit bit comparator 60 will indicate to count control 54 that pulses are no longer required and that the machine axis is therefore "in position."

The explanation given herein of the system in FIG. 2 is necessarily somewhat abbreviated for the purposes of simplicity since this explanation is given only by way of comparison with the numerical positioning control comprising the present invention. The numerical positioning control system of FIG. 2 is explained in detail in the above-cited Wilson patent. For the purposes of the present explanation, it is advisable to point out the salient features of the numerical positioning control system of FIG. 2. First, it should be noted that the numerical positioning control of FIG. 2 utilizes a single resolver 46 as compared to the three resolvers used in the prior art system shown and described in connection with FIG. 1. In addition to the cost savings which result from using a single resolver, the single resolver approach is also desirable since it precludes the necessity for having to delicately adjust the relative positions of the three resolvers used in the system of FIG. 1. In addition, a single resolver system of the type shown in FIG. 2 has the advantage of being able to operate with a "full floating zero." That is, the position control system of FIG. 1 has a fixed zero point which is established by the fixed, mechanical relationships between the three resolvers used in that system. In the system of FIG. 2, there is only a single resolver and therefore the zero of machine axis can be selected at the will of the machinist operating the controlled machine tool.

In addition, since the Wilson system of FIG. 2 uses a velocity command 52 which determines the rate at which pulses are fed to the variable phase counter 56, the numerical positioning control system shown in FIG. 2 can be programmed with a feed rate and can therefore control the rate at which the controlled axis moves. This is to be compared with the system of FIG. 1 wherein the rate of machine motion is essentially fixed by traverse, feed and proportional rates.

The disadvantage of the system of the Wilson patent rests primarily on the fact that the comparison between the command and position data is done in static storage registers which makes it more expensive and difficult to determine the difference between the numbers. This is to be compared with the comparison technique used in the Evans system of FIG. 1 which is essentially a phase comparison technique which makes for easier and simpler comparison of the information which is contained in the phase modulated signals.

Figure 3:
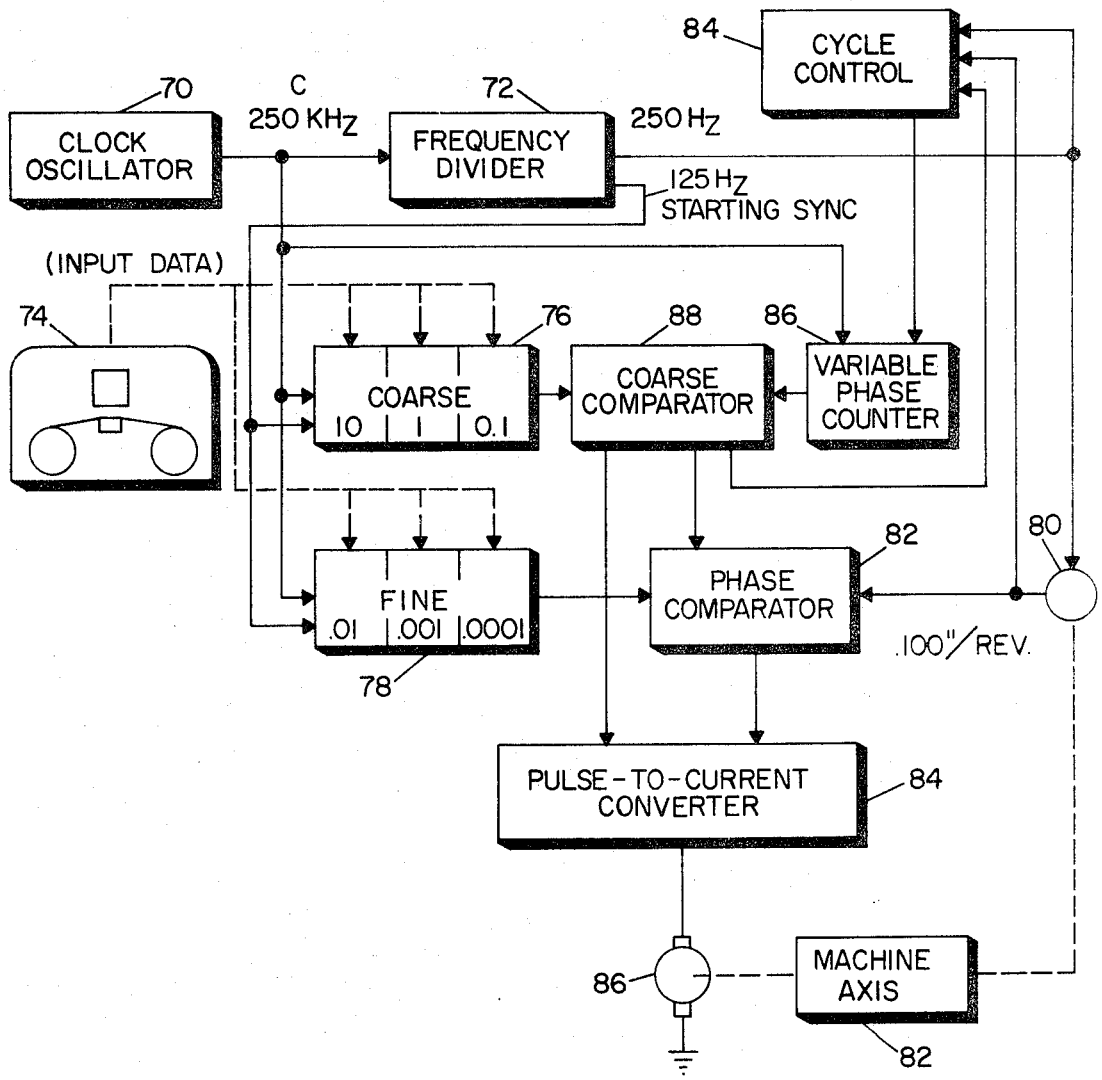
FIG. 3 is a block diagram of a preferred embodiment of the numerical positioning control system comprising the present invention.

FIG. 3 is a block diagram illustrating a numerical positioning control which constitutes the preferred embodiment of the present invention.

The numerical positioning control of FIG. 3 exemplifying one embodiment of the present invention utilizes a means for synchronizing system operations such as the clock oscillator 70. As was true with the prior art systems shown in FIGS. 1 and 2, the clock oscillator 70 puts out a fixed frequency square wave which is used to synchronize the operation of the control system. For the purposes of the present explanation, the basic output frequency of the clock oscillator is shown to be 250 kHz, but it is to be understood that any frequency could be selected which is compatible with the type of computational hardware used in the control system. The output of the clock oscillator 70 is fed to a frequency divider 72 which divides the basic input frequency down into a lower reference frequency which, in the particular example shown in FIG. 3, is 250 Hz. Thus far, the control system of FIG. 3 is identical with that shown in FIGS. 1 and 2.

The input data to the control system of FIG. 3, like that of FIGS. 1 and 2, is supplied from some input data source such as the tape reader 74. The input data from tape reader 74 is fed to a pair of command phase counters designated the coarse command phase counter 76 and the fine command phase counter 78. In this respect, the use of the input data is the same as that in the system of FIG. 1 in that the input data is placed in these command phase counters and used to determine the phase of these command phase counters so as to have the phase of these signals indicate the input dimensions desired. The control system of FIG. 3 uses a single position transducer such as the resolver 80 which is mechanically connected to the controlled machine axis 82. By way of example, the resolver 80 in FIG. 3 is shown to have a scale factor of 0.100 inch per revolution so as to be consistent for the purposes of comparison with the systems shown in FIGS. 1 and 2 above. The phase of the fine command phase counter 78 is at the appropriate time, compared with the phase of the resolver 80 by a phase comparator 82 and is used at least during a portion of the machine operation to control the pulse-to-current converter 84 which feeds current pulses to the motor 86 connected to the controlled axis. To this extent, the system of FIG. 3 is comparable to the Evans system of FIG. 1.

Note however, that in distinction to the Evans system of FIG. 1, the system of the present invention utilizes a single position transducer as opposed to the three resolvers shown in FIG. 1. The present invention takes the output of the single position transducer and converts that output into a second phase varying signal which is scaled proportional to the command phase counter 76 and is then used for a phase type comparison. This is to be compared with the approach in the numerical positioning control system of FIG. 2 which takes the output of the single resolver and converts that into a static digital number which then requires comparatively expensive and complex comparison circuitry. Thus, one of the advantages of the present invention is that it converts the output of the single position transducer in a small scale factor into a phase varying signal of a larger scale factor which can then be compared with the phase of the coarse command phase counter 76 in a manner essentially the same as that used in the prior art system shown in FIG. 1. That is, the phase varying output of the resolver 80 forms one input to a cycle control 84.

Figure 4:
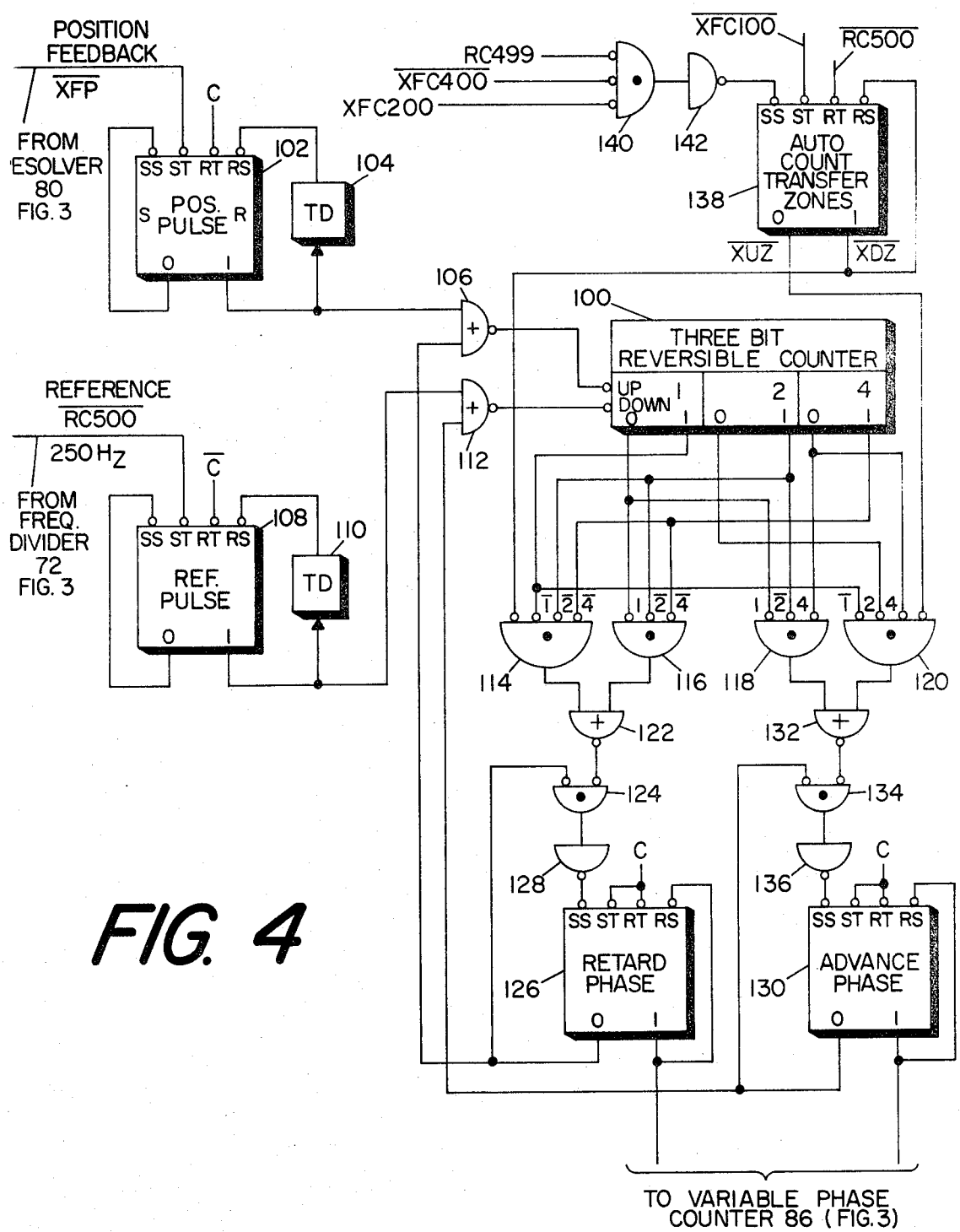
FIG. 4 is a detailed logic diagram of the cycle control unit of FIG. 3.

The cycle control 84 is shown and explained in more detail in FIG. 4. For the moment, it suffices to say that the function of cycle control 84 is to examine the output of the resolver 80 and generate a pulse each time the resolver 80 goes through a predetermined amount of rotation. This comparison is made with respect to the 250 Hz reference input which is also fed to the cycle control 84. Briefly, each time the resolver 80 goes through the predetermined amount of rotation, cycle control 84 feeds a pulse to vary the phase of a variable phase counter 86. Since the variable phase counter 86 changes its phase each time the resolver 80 goes through the predetermined amount of rotation, the phase of the variable phase counter 86 will be scaled so as to correspond with the scale of the coarse command phase counter 76. Since the outputs of the coarse command phase counter 76 and the variable phase counter 86 are both phase varying signals having the identical scale factor, they are fed to a coarse comparator 88 which performs a function very similar to that of the coarse and medium comparators shown in the system of FIG. 1. That is, during the initial portions of the operation on a particular block of data, it can be assumed that the distance between the present position of the machine axis 82 and the ultimate desired position is more than a predetermined amount. This will be indicated by comparing the phases of the coarse command phase counter 76 and the variable phase counter 86. Under these circumstances, the output of the coarse comparator 88 is fed to the pulse-to-current converter 84 which then feeds current of the proper magnitude and direction to the control motor 86. When the difference between the phase of the coarse command phase counter 76 and the variable phase counter 86 becomes less than a predetermined amount, the coarse comparator indicates to the phase comparator 82 that the pulse-to-current converter 84 is now to be controlled by comparison in phase comparator 82 of the fine phase counter 78 and the resolver 80. At this point, the system begins to feed current to the controlled motor 86 at a rate which is essentially proportional to the error remaining between the desired and present positions. In addition, it may also be desired to change the speed from the initial or traverse speed to a second speed sometimes referred to as the feed speed before entering the proportional zone. This will be shown and explained referring to FIG. 7 in the detailed explanation of the coarse comparator 88, phase comparator 82 and pulse-to-current converter 84, all shown in detail in FIG. 6.

Briefly summing up the operation of the control system of FIG. 3, it can be seen that the presence of new input data from the tape reader 74 causes the phase of the coarse command phase counter 76 and the fine command phase counter 78 to change so as to reflect the next machine axis position desired. The coarse comparator 88 initially assumes control by comparing the variable phase counter 86 with the command phase counter 76 until such time as a certain predetermined minimum difference is noted. As the machine moves, the resolver 80 rotates and each time the resolver 80 goes through a predetermined amount of rotation, the cycle control 84 puts out a pulse which changes the phase of a variable phase counter 86 so as to essentially simulate the type of signal which would be received by the coarse comparator 88 if the system were equipped with a coarse resolver such as the coarse resolver 28 shown in the system of FIG. 1. As pointed out above, the advantage in generating a variable phase signal indicative of the machine position is that it simplifies the comparison between the present machine position as indicated by variable phase counter 86 and the desired machine position as indicated by the coarse command phase counter 76.

Figure 6:
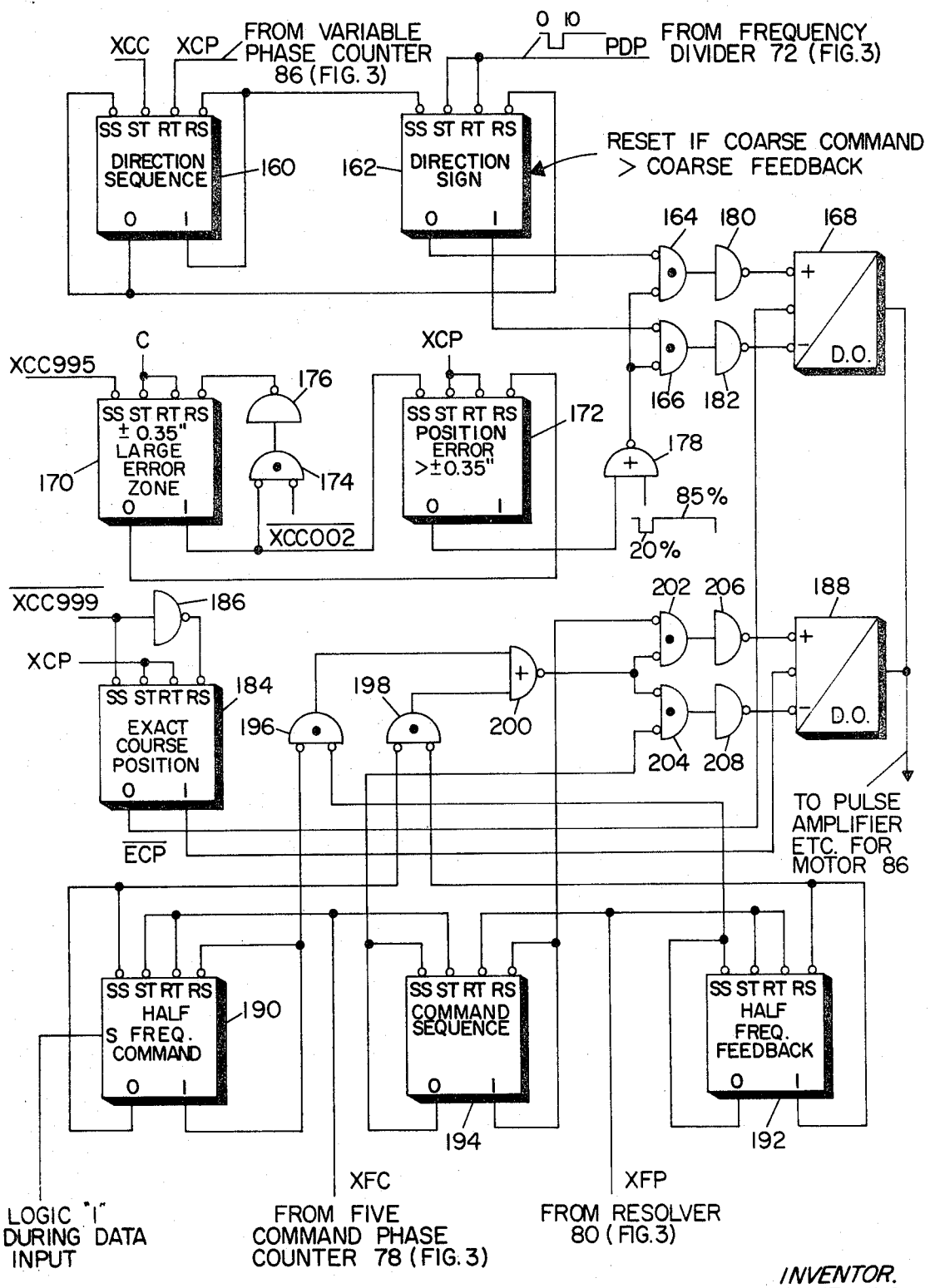
FIG. 6 is a detailed logic diagram of the coarse comparator, phase comparator and pulse-to-current converter of FIG. 3.

Before turning to a detailed description of the logic diagrams of FIGS. 4 and 6, it is necessary to explain briefly the operation of the various logic elements used therein. The present invention will be explained by reference to the logic diagrams of FIGS. 4 and 6 which are digital logic elements of the negative logic type and operate between one of two digital signal levels referred to as logic "0" and logic "1." In the preferred embodiment of the present invention, the signal logic "0" will be some positive voltage, say plus 6 volts, whereas the logic "1" will be some negative voltage or 0 volts. These logic elements and the particular type of logic system used are for exemplary purposes only and are not intended in any way to limit the true scope of the present invention.

The logic element labeled 102 in FIG. 4 is a steered flip-flop of the well known type. It has two inputs on either side labeled "S" and "R". The "S" input is the direct set terminal and operates such that the application of a logic "1" on that terminal will cause the flip-flop 102 to assume the set state. Similarly, the "R" input terminal is the direct reset input terminal and operates such that the application of a logic "1" on that terminal will cause flip-flop 102 to immediately assume the reset state. In addition, the flip-flop 102 has four other input terminals. These are the set steering terminal "SS," the set trigger terminal "ST," the reset trigger terminal "RT," and the reset steering terminal "RS." The flip-flop 102 will assume the set state if the signal on its set steering terminal SS goes to logic "0" followed by the signal on its set trigger terminal ST going to logic "0." The steering signal on the set steering terminal must precede a trigger (i.e., a signal going from logic "1" to logic "0") on the trigger terminal by a predetermined amount which depends upon the particular type of logic hardware being employed in the system. Similarly, flip-flop 102 will be caused to assume the reset state by placing a logic "0" on its reset steering terminal followed by a trigger on a reset trigger terminal. The present state of flip-flop 102 is indicated by the logic signals present at its output terminals. The output terminals are labeled 0 and 1 and indicate the logic signal present at the terminal when the flip-flop is in its normal or reset state. That is, if the flip-flop 102 is reset, the 0 output terminal will be a logic "0." Similarly, if the flip-flop 102 is reset, the 1 output terminal will be a logic "1." When flip-flop 102 changes to the set state, the logic signal present at these two output terminals will be exactly the reverse of the labels used. That is, when flip-flop 102 is set, the logic signal present at the 0 output terminal will be a logic "1" whereas the logic signal present at the 1 output terminal will be a logic "0."

The logic element labeled TD 104 of FIG. 4 is a simple time delay element. The time delay 104 operates such that a logic "0" at its input (indicated by the arrow) will be delayed by a predetermined time (either fixed or variable) before being relayed to its output terminal. In general, the time delay effect of a time delay element such as 104 will be operative only to delay the time of a logic "0" and will have no time delay when the input goes to logic "1." In that case, the output will immediately go to logic "1."

As is true in most present day logic systems, the logic system of FIGS. 4 and 6 employs a single type of gate. This gate is variously represented in the drawings of FIGS. 4 and 6. For example, gate 140 is illustrated by having circles at the inputs, a dot in the center and no circle on the output. This same type of gate is also illustrated by gate 106 which has a circle on its output, a plus sign in the center and no circles on its input. Briefly, this type of gate (known as a NOR gate) operates such that the output will be a logic "1" if and only if all of the inputs are logic "0." Under any other condition, the output of the NOR gate as illustrated by gates 106 and 140 will be a logic "0." The purpose of the different markings of gates 106 and 140 is to illustrate basically the operation of that particular element in the circuit. That is, gate 140 is marked with a dot in the center and circles at its inputs to indicate that it functions basically as an AND gate in that a desired condition is reached when all of its inputs go to logic "0" so that its output goes to logic "1." Conversely, gate 106 is marked with a plus sign in its center to indicate that it functions basically as an OR gate in that the desired output is a logic "0" which is achieved when either of the inputs goes to logic "1."

The logic element shown with the number 142 in FIG. 4 is a simple inverter and operates to invert the sense of the logic signal presented at its input. That is, if the signal on the input to inverter 142 is a logic "1," then the signal on the output (indicated by the circle) is a logic "0" and vice versa.

The logic element labeled 100 in FIG. 4 is a three bit reversible counter. It has two input terminals, one labeled "UP" and the other labeled "DOWN." These inputs have circles to indicate that the counter will count in that particular direction when the logic signal at its input goes from logic "1" to logic "0." Thus, the three bit reversible counter 100 will count up, or in the positive direction, when the signal at its UP input terminal goes from logic "1" to logic "0." Conversely, three bit reversible counter 100 will count down or in the backward direction when the signal on its DOWN input terminal goes from logic "1" to logic "0." Counters of this type are well known in the art and can either be constructed from discrete logic elements or may be found as a single packaged unit.

The logic element labeled 168 in FIG. 6 is a discriminator output (DO) element. The basic purpose of the DO element 168 is to convert time varying logic signals at its inputs (indicated by the circles) into proportional current pulses of the desired polarity and duration. The DO element 168 has three inputs. The top input is labeled with a plus sign to indicate that the desired current output from DO element 168 is positive when the signal on that terminal goes to logic "0." The bottom input is labeled minus and is used to activate DO element 168 to put out negative current pulses. Finally, the center, unlabeled input is the enable input which must be at logic "0" if the discriminator is to be allowed to put out current pulses. If the enable input is a logic "1," then the state of the plus and minus input terminals is irrelevant since the DO element 168 is prevented from generating current. However, if the enable input terminal is a logic "0," then the DO element 168 will generate current pulses of a width and polarity directly proportional with the width of pulses presented at its plus and minus input terminals. That is, when the plus input terminal has a logic "0," the output of the DO element will be positive current so long as the input signal of the plus terminal remains at logic "0." Conversely, if the enable input is a logic "0" and there is a logic "0" on the minus input terminal, then the DO element 168 will put out current which is minus in polarity and stays on so long as the logic "0" remains at the minus input terminal. In this fashion, DO element 168 operates to generate current pulses which are directly proportional in both polarity and time to the signals on its three input terminals. In its simplest aspects, DO element 168 may be either a packaged unit or, conversely, may be constructed of discrete elements such as a pair of constant current generators which are controlled by two input gates.

FIG. 4 is a detailed logic diagram of the cycle control 84 of FIG. 3. As pointed out hereinbefore, the purpose of the cycle control 84 is to accept the output of the resolver 80 of FIG. 3 and generate pulses which are indicative of a predetermined amount of travel by resolver 80. These pulses are fed to the variable phase counter 86 so as to generate a second phase varying signal indicative of the position of the controlled machine axis 82. It is to be noted that the present embodiment of the cycle control 84 generates an output pulse to either advance or retard the phase of the variable phase counter 86 for each revolution of the resolver 80. However, the present invention is not limited to a cycle control which generates a pulse for each revolution, but rather contemplates a cycle control unit which can generate output pulses for either fractional parts or integral numbers of resolver revolutions. Thus, for example, the output of the cycle control 84 might be one pulse for every half revolution of the resolver 80 or, alternatively, one pulse for every other revolution of the resolver 80. The number of pulses generated per revolution of the resolver 80 is a matter of design choice, depending upon the particular characteristics of the numerical position control in which it is contained.

Briefly, the preferred embodiment of the cycle control 84 as illustrated by FIG. 4 operates by counting a reversible counter 100 in opposite directions each time the position feedback from the resolver 80 and the 250 Hz reference from the frequency divider 72 arrive at the input to the cycle control. The state of reversible counter 100 is continuously monitored and when certain predetermined conditions have been achieved an output pulse is generated to appropriately advance or retard the phase of the variable phase counter 86 of FIG. 3.

The detailed operation of the cycle control of FIG. 4 will be explained in part by reference to the waveforms of FIGS. 5(a), 5(b), 5(c) and 5(d). Before turning to these waveforms, however, it is briefly necessary to explain the operation of the three bit reversible counter 100. Briefly, the cycle control of FIG. 4 operates by counting the reversible counter 100 in the forward or up direction each time the position feedback signal $\overline{XFP}$ from resolver 80 goes to logic "0." Similarly, the three bit reversible counter 100 will count in the reverse or down direction each time the reference 250 Hz signal $\overline{RC500}$ from the frequency divider 72 of FIG. 3 goes to logic "0." The position feedback signal $\overline{XFP}$ is fed to the "position pulse" flip-flop 102 and connected to its set trigger input. Since position pulse flip-flop 192 is self-steered to set (that is, its 0 output terminal is directly connected to its set steering terminal) the position pulse flip-flop 102 will assume the set state when the position feedback signal $\overline{XFP}$ goes to logic "0." At this point, the 1 output terminal of the position pulse flip-flop 102 will assume the logic "0" state. The 1 output terminal of the position pulse flip-flop 102 is connected via a time delay unit 104 to its reset steering input terminal. Thus, when the 1 output terminal of the position pulse flip-flop 102 goes to logic "0," the reset steering input terminal will go to logic "0" after the time delay of time delay unit 104. As soon as the time delay of time delay unit 104 has been completed, the position pulse flip-flop 102 will be steered to reset. A clock signal C is connected to its reset trigger input. The clock signal C may be any relatively high frequency signal such as, for example, the 250 kHz output of the clock oscillator 70. When the clock signal C goes to logic "0," the position pulse flip-flop 102 will switch from the set to the reset state. At this time, the 1 output terminal of the position pulse flip-flop 102 switches from the logic "0" to the logic "1" state. Since the 1 output terminal is connected to one input of gate 106, the output of gate 106 will, at this time, switch from logic "1" to logic "0." Since the output of gate 106 is connected to the up-count input terminal of reversible counter 100, the reversible counter 100 will count up by one count at this time.

Similarly, the reference pulse flip-flop 108 is connected to the reference 250 Hz signal $\overline{RC500}$ which is fed to its set trigger terminal. Like the position pulse flip-flop 102, the reference pulse flip-flop 198 is also self-steered to set. And, in a fashion identical to the position pulse flip-flop 192, the reference pulse flip-flop 108 is also self-steered to set. And, in a fashion identical to the position pulse flip-flop 102, the reference pulse flip-flop 108 has a time delay unit 110 connected from its 1 output terminal to its reset steering input terminal. The only difference between the connection of the position pulse flip-flop 102 and the reference pulse flip-flop 108 is that the reference pulse flip-flop has the signal $\overline{C}$ connected to its reset trigger input terminal. The signal $\overline{C}$ is the inverse of the clock signal C so as to assure that the position pulse flip-flop 102 and the reference pulse flip-flop 108 do not reset at the same time. This prevents attempting to count the reversible counter 100 in both directions at the same time if the position feedback signal $\overline{XFP}$ and the reference signal $\overline{RC500}$ happen to be in phase.

When the reference pulse flip-flop 108 changes from the set to the reset state, its 1 output terminal changes from logic "0" to logic "1." Since the 1 output terminal of reference pulse flip-flop 108 forms one of the inputs to gate 112, it will be obvious that the output of gate 112 changes at this time to logic "0." Since the output of gate 112 is connected to the DOWN input terminal of the reversible counter 100, it can be seen that the reversible counter 100 will count down one count when the reference pulse flip-flop 108 resets. In this way, the reversible counter 100 will count down each time the reference signal $\overline{RC500}$ goes to logic "0."

The condition of the reversible counter 100 is continuously monitored by four gates, 114, 116, 118 and 120. It will be clear that the state of the reversible counter 100 is indicative of the phase difference between the position feedback $\overline{XFP}$ and the reference $\overline{RC500}$. It will further be clear that if the resolver 80 of FIG. 3 which generates the position feedback signal $\overline{XFP}$ is rotating due to the movement of the controlled machine axis, the frequency of the position feedback signal $\overline{XFP}$ will be either greater or less than the reference signal $\overline{RC500}$ since the reference signal $\overline{RC500}$ is the excitation signal for the resolver.

The effect of this difference in frequency is to have the phase relationship of the reference and position signals constantly varying. This, inturn, continuously changes the state of the reversible counter 100, as illustrated by FIG. 5(a).

In the upper portion of FIG. 5(a), the reference signal $\overline{RC500}$ is shown at the normal 250 Hz rate. The position signal $\overline{XFP}$, on the otherhand, is indicated at a slightly lower frequency than the reference signal as would result when the resolver 80 is turning in the "negative" direction, that is, the rotation of the rotor in the resolver 80 is in the same direction as the rotation of the field on its stator windings. The lower portion of this same figure illustrates a position feedback signal $\overline{XFP}$ which is at a higher frequency than the reference signal as would result when the resolver 80 is turning in a "positive" direction, that is, the revolution of the resolver rotor is not the same as the revolution of the field on the stator windings.

Referring to the upper portion of FIG. 5(a), the operation of the reversible counter 100 will be explained. Assuming that the count stored in reversible counter 100 begins at 0, the arrival of the first logic "0" pulse on the reference $\overline{RC500}$ (as illustrated at point A in that waveform) will cause the reversible counter 100 to count down one count. Since the reversible counter 100 is initially at 0, counting down one count will cause the reversible counter 100 to count to the number 7. When the first logic "0" pulse on the feedback signal $\overline{XFP}$ arrives (as shown in point B in that waveform) the reversible counter 100 will count up by one count which returns to the number in the counter to 0. Similarly, at point C in the reference $\overline{RC500}$ waveform, the reversible counter 100 will again count down to 7 and at point D in the $\overline{XFP}$ waveform it will count up again to 0. Operation in this fashion with the count in the reversible counter 100 alternating between 0 and 7 until point E in the reference waveform, at which time the reference and position waveforms are once again back in phase. The resynchronism of the reference and position waveforms is accomplished by a complete revolution of the resolver 100 indicating that the resolver has traversed a distance of 0.100 inch. At this time, the state of the reversible counter changes from 7 to 0 and then right back to 7 since the up and dow count signals from the position feedback and reference arrive at almost the same time. The next pulse on the reference at point F counts the counter down one more count until it achieves the number 6 state. Therefore, monitoring the state of the reversible counter 100 gives an indication as to the number of revolutions of the resolver 80 of FIG. 3.

Similarly, referring to the lower portion of FIG. 5(a), it can be seen that the first pulse to arrive at the reversible counter 100 comes from the position feedback $\overline{XFP}$ at point A in that waveform. At this time, the reversible counter 100 assumes the 1 state until the arrival of a logic "0" pulse at point B in the reference waveform, at which time it reverts back to the 0 count. Operation continues in this fashion as before with the count in the reversible counter 100 alternating between 1 and 0 until point C in the reference waveform, at which time the reference and position waveforms are once again back in synchronism. As was true in the explanation of the upper portion of this figure, the effect of the reference and position waveforms assuming the same phase again is to indicate that the position of the resolver has changed by one full revolution or 0.100 inch. At this time, the state of the reversible counter 100 changes almost instantaneously from 2 back to 1 and thereafter the state of the counter alternates between the numbers 1 and 2, as opposed to the numbers 0 and 1 as was true in the earlier portion of this waveform.

From the foregoing, it will be apparent that the number stored in reversible counter 100 can be monitored so as to indicate when the resolver 80 has traversed a complete revolution. This is accomplished by gates 116 and 118. Gate 116 is connected to three sections of the reversible counter 100 so that its output will go to logic "1" if the number 6 is present in the reversible counter 100. As was seen in the explanation of the upper portion of FIG. 5(a), the presence of a 6 in the reversible counter 100 indicates that the resolver has traversed a full 360° or 0.100 inch of travel of the controlled machine axis. The output of gate 116 forms one of the inputs to gate 122. When the output of gate 116 goes to logic "1," the output of gate 122 will go to logic "0." The output of gate 122 forms one of the inputs to gate 124, the other input coming from the 0 output terminal of the retard phase flip-flop 126. When the output gate 122 goes to logic "0," the output of the gate 124 will go to logic "1" if the retard phase flip-flop 126 is reset. The output of gate 124 is connected to an inverter 128 whose output is in turn connected to the set steering input terminal of the retard phase flip-flop 126. Thus, when the reversible counter 100 reaches the 6 state, the retard phase flip-flop 126 will be steered to set upon the arrival of the next clock pulse C on its set trigger terminal. Thus, at the next clock pulse, the retard phase flip-flop 126 will set and will stay set for one clock period and then at the next clock pulse will reset due to the fact that flip-flop 126 is "self-steered" to reset by virtue of the connection of the 1 output terminal to the reset steering input terminal.

The 1 output terminal of the retard phase flip-flop 126 is connected to the variable phase counter 86 of FIG. 3. Since the retard phase flip-flop stays set for one clock time, it will be apparent that the 1 output terminal generates a pulse, one clock width in duration, which is in turn transmitted to the variable phase counter so as to retard its phase in the well known fashion.

Gate 118, on the other hand, monitors the reversible counter 100 and generates a logic "1" on its output when a 2 is stored in the reversible counter 100. In a fashion similar to that explained for the retard phase flip-flop 126, the presence of a 2 in reversible counter 100 will cause the retard phase flip-flop 130 to be set steered to reset via gates 132, 134 and inverter 136. As was true in the case of the retard phase flip-flop 126, the advance phase flip-flop 130 also stays set for one clock time and generates a pulse on its 1 output terminal which is transmitted to the variable phase counter 86 of FIG. 3 and advances the phase of the variable phase counter 86 so as to correct the time varying output of that counter in response to the motion of the resolver 80.

When the advance or retard phase flip-flops 126, 130 transmit a pulse to the variable phase counter 86, they also correct the count in the reversible counter 100 by way of the connection of their 0 output terminals to gates 106 and 112. That is, if the reversible counter 100 counts backwards to the number 6, causing the retard phase flipaflop 126 to set, its 0 output terminal goes to logic "1." Since this 0 output terminal is connected to one input of gate 106, a pulse will be transmitted to the UP count terminal of reversible counter 100 so as to count it back up to 7 and prepare the counter to once again indicate when the position feedback signal $\overline{XFP}$ has gone through another complete revolution. Similarly, the setting of the advance phase flip-flop 130 when the reversible counter 100 reaches the 2 state causes its 0 output terminal to go to logic "1." Since the 0 output terminal of advance phase flip-flop 130 is connected to one input of gate 112, a pulse will be transmitted to the DOWN count terminal of reversible counter 100 so as to count it down by one and return it to the 1 state and thus prepare the reversible counter to indicate again when the position feedback signal XFP has gone through an additional revolution.

The description as set forth thus far provides for the advancing or retarding of the phase of the variable phase counter 86 each time the resolver goes through a complete revolution in one direction or the other. That is, the phase of the variable phase counter 86 is not altered until such time as a complete revolution of the resolver 80 has been recorded by the reversible counter 100. In certain applications, it may be necessary to advance or retard the phase of the variable phase counter 86 for only a partial revolution of the resolver 80. This is accomplished by gates 114 and 120 which operate in conjunction with the automatic count transfer zone flip-flop 138.

Briefly, the function of the automatic count transfer zone flip-flop 138 is to allow the phase of the variable phase counter 86 to be advanced or retarded as a function of the preset number in the fine command phase counter 78. That is, the automatic count transfer zone flip-flop monitors periodically the state of reversible counter 100 and depending upon the number in reversible counter 100 may cause the retard phase flip-flop 126 or the advance phase flip-flop 130 to set at positions which are displaced from the commanded position by plus or minus 180°, 540°, 800°, 1,160°, etc.

The operation of the automatic count transfer zone flip-flop 138 is illustrated in FIG. 5(b). In this figure, the reference signal $\overline{RC500}$ is shown alternating between logic "1" and logic "0" at a 250 Hz rate. The numbers shown above this waveform indicate the state of the counters which form the frequency divider 72 in FIG. 3. That is, from 0 to 500 of the frequency divider 72, the reference signal $\overline{RC500}$ is a logic "1" whereas from 500 to 1,000 (or 0) the output of the frequency divider 72 is a logic "0."

The next waveform shown in FIG. 5(b) is the $\overline{XFC}$ waveform which corresponds to the output of the fine command phase counter 78 of FIG. 3. This waveform is drawn assuming that the last three digits of the commanded position are equal to 200 so that the phase of the fine command phase counter is advanced by 200 counts. The next three waveforms shown, $\overline{XFC400}$, XFC200 and $\overline{XFC100}$, are taken from various points in the fine command phase counter. Briefly, the signal $\overline{XFC400}$ is a logic "1" at all times except when the fine command phase counter is between 400 and 700. Similarly, the XFC200 signal is a logic "1" when the fine command phase counter is between 200 and 400 and again between 600 and 800, the remainder of the time this signal is a logic "0." Finally, the signal $\overline{XFC100}$ alternates between logic "0" and logic "1" every 100 counts of the fine command phase counter.

Referring back to FIG. 4, the signals $\overline{XFC400}$ and XFC200 form two of the inputs to gate 140. The third input is the signal RC499 which comes from the reference counter 72 of FIG. 3 and will be explained in detail later hereinafter. The output of gate 140 is connected to an inverter 142 whose output is in turn connected to the set steering terminal of the automatic count transfer zone of flip-flop 138. Assuming for the moment that the signal RC499 is a logic "0," reference to the waveforms $\overline{XFC400}$ and XFC200 shows the output of gate 140 will be a logic "1" when the reference counter is between 400 and 600 counts. At this time, the set steering terminal of flip-flop 138 will be logic "0." Therefore, since the waveform $\overline{XFC100}$ is connected to the set trigger of flip-flop 138, it will be apparent that the automatic transfer zone flip-flop 138 will assume the set state when the fine command phase counter reaches 500.

The automatic count transfer zone flip-flop 138 is self-steered to reset by virtue of the connection of its 1 output terminal to its reset steering terminal. The reset trigger terminal is connected to the reference signal $\overline{RC500}$ so as to reset this flip-flop when the reference counter is at 500. The signals $\overline{XDZ}$ and $\overline{XUZ}$ emanate from the 1 and 0 output terminals respectively of flip-flop 138. These signals are illustrated in FIG. 5(b) and show how these zones are generated for the particular circumstances of a commanded position which has its last three digits being 200.

Briefly, the $\overline{XUZ}$ and $\overline{XDZ}$ outputs of the automatic count transfer zone flip-flop 138 from one input to gates 114 and 120 and act to retard or advance the phase of the variable phase counter prior to the resolver having traveled a full revolution. Thus, for example, the $\overline{XDZ}$ signal is connected to gate 114 along with three outputs from the reversible counter 100 so as to generate an output signal and set the retard phase flip-flop 126 if the reversible counter 100 contains a 7 when flip-flop 138 is set. Conversely, the $\overline{XUZ}$ is connected to one input of gate 120 along with three inputs from reversible counter 100 and operates to set the advance phase flip-flop 130 if the reversible counter 100 has a 1 in it when the automatic count transfer zone flip-flop 138 is reset.

FIGS. 5(c) and (d) illustrate the operation of the cycle count control of FIG. 4 when the automatic count transfer zone flip-flop 138 is provided to control the operation of the retard and advance phase flip-flops. In FIG. 5(c), there is illustrated a feedback signal $\overline{XFP}$ which is of a higher frequency than the reference signal $\overline{RC500}$. At point A in the $\overline{XFP}$ waveform the reversible counter 100 counts up to 1. At this point, however, flip-flop 138 is set and signal $\overline{XUZ}$ is a logic "1" so that there is no output from gate 120. At point B in the $\overline{RC500}$ waveform the reversible counter returns to its 0 state by virtue of a countdown pulse from the reference pulse flip-flop 108. At point C in the $\overline{XFP}$ waveform the reversible counter 100 counts up to 1. At this point, however, flip-flop 138 is reset so that signal $\overline{XUZ}$ is a logic "0." This activates gate 120 and steers the advance phase flip-flop 138 to set at the next clock pulse by way of gates 132 and 134 and inverter 136. As soon as the advance phase flip-flop 130 sets, the reversible counter 100 counts back down to 0 since the 0 output terminal of flip-flop 130 feeds through gate 112 to count reversible counter 100 down. Thus, at the next pulse from the reference $\overline{RC500}$ the reversible counter counts down to 7 and the counter then alternates from 7 to 0 as shown in FIG. 5(c) until finally the waveforms $\overline{RC500}$ and $\overline{XFP}$ are back in phase. As can be seen from FIG. 5(c), the reference $\overline{RC500}$ went through four complete cycles while the position feedback $\overline{XFP}$ went through five cycles before they finally came back into phase with each other so that it took the entire portion of the waveforms of FIG. 5(c) for the resolver to travel one complete revolution. Note, however, that the phase of the variable phase counter 86 was advanced by the setting of the advance phase flip-flop 130 about one-third of the way through this operation. Therefore, the advance phase flip-flop 130 operated to advance this phase of the variable phase counter before a complete revolution of the resolver 80 had taken place.

Figure 5D:
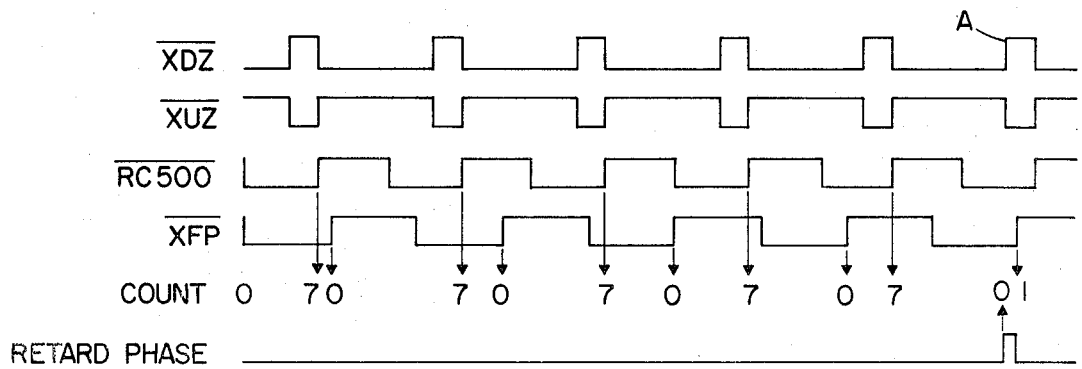

In FIG. 5(d), the position feedback signal $\overline{XFP}$ from the resolver 80 of FIG. 3 is shown at a lower frequency than a reference signal $\overline{RC500}$. As explained above in conjunction with FIG. 5(a), under these circumstances the reversible counter 100 changes from the 7 to the 0 stage alternatively until point A in the $\overline{XDZ}$ waveform. At this point, gate 114 is activated since the reversible counter has a 7 and signal $\overline{XDZ}$ is a logic "0." At this point, the retard phase flip-flop is steered to set through gates 122 and 124 and inverter 128 and sets at the next clock pulse. When the retard phase flip-flop 126 sets, it relays a pulse to the variable phase counter 86 so as to retard its phase by one count. Simultaneously, the 0 output terminal of flip-flop 126 counts the reversible counter 100 up to 0 by virtue of its connection to gate 106.

Examination of the waveforms of FIG. 5(d) will show that the duration of the waveform shown have not yet brought the position feedback signal $\overline{XFP}$ back into phase with the reference signal $\overline{RC500}$. However, a pulse was generated by the retard phase flip-flop 126 so as to retard the phase of the variable phase counter 86 prior to a complete rotation of the resolver 80. In this way, the phase of the variable phase counter 86 was changed during the rotation of the resolver 80 rather than waiting until a complete revolution of the resolver had taken place.

It is important to note that the timing of the operation of the various flip-flops and counters in FIG. 4 can be critical depending upon the type of logic hardware used and the relative phase relationships between the various signals involved. Therefore, the preferred embodiment of FIG. 4 is necessarily somewhat simplified with the recognition that it may be necessary to adjust certain of the clocking pulses so as to assure that the counter 100 assumes its proper state. That is, for example, the retard phase flip-flop 126 and the position pulse flip-flop 102 both feed through gate 106 to the UP terminal of the reversible counter 100. There may be circumstances where the retard phase flip-flop 126 and the position pulse flip-flop 102 might be caused to command a countup of the reversible counter 100 at the same time. Under such circumstances, the reversible counter 100 might well "miss" one of these counts. In order to prevent that, it may be necessary to adjust the signals used to set and reset these flip-flops so as to assure that they cannot both be transmitting counting signals to the reversible counter 100 at the same time.

FIG. 6 is a detailed logic diagram showing a preferred embodiment of the coarse comparator 88, the phase comparator 82, and the pulse-to-current converter 84 of FIG. 3. As will be recalled from the discussion of FIG. 3 above, the purpose of the coarse comparator 88 is to compare the phase of the coarse command phase counter 76 with the phase of the variable phase counter 86. Similarly, the purpose of the phase comparator 82 is to compare the phase of the fine command phase counter 78 with the phase of the resolver 80. Finally, the purpose of pulse-to-current converter 84 is to generate current pulses for the drive motor 86 in response to the comparisons which take place in the coarse and phase comparators 88 and 82. While it is somewhat difficult in this particular embodiment to clearly separate the elements into these three blocks as set forth in FIG. 3, the following breakdown is essentially correct. The coarse comparator 88 includes flip-flops 160, 162, 170, 172 and 184. The phase comparator 82 consists of flip-flops 190, 192 and 194 and the pulse-to-current converter 84 includes the DO elements 168 and 188 and their associated gating.

The detailed operation of the logic diagram of FIG. 6 will be explained by reference to the graph of FIG. 7 and the waveforms of FIG. 8. Referring then to FIG. 7, this graph shows a typical speed versus position error curve. The abscissa of this graph reveals the position error, that is, the difference between the commanded position of the controlled axis and the actual position of the controlled axis. The ordinate of this graph shows the speed at which the controlled axis will travel as a function of the position error. The position error versus speed characteristics of FIG. 7 are, of course, only typical and are offered here by way of example only. In this particular characteristic curve, it can be seen that for position errors in excess of plus or minus 0.350 inch, the controlled axis travels at full or 100 percent speed. When the coarse comparator 88 determines that the controlled axis is within plus or minus 0.350 inch of the command position, the speed is reduced to 20 percent of full speed. Finally, at some point relatively near the final position, for example 0.050 inch, the speed of the controlled axis becomes proportional to the position error.

The detailed logic diagram of FIG. 6 enables the numerical positioning control of the present invention to position the controlled axis in accordance with the speed versus position error characteristics of FIG. 7. As was pointed out above, the characteristics of FIG. 7, to the extent that the logic diagram of FIG. 6 pertains particularly to those characteristics, are to be considered by way of example only. Any number of modifications will be apparent to those of ordinary skill in the art such as, for example, a three-speed stepping mode wherein the speed steps from say 100 percent to 50 percent at a first distance from final position and then is further reduced to a third percentage of full speed before becoming proportional. In addition, it is, of course, clear that the particular points at which the speed changes and the proportional zone begins are particularly a matter of design choice and will vary significantly from one machine to the next as a function of the desired speed, accuracy, dynamic characteristics, etc. of the particular type of machine tool being controlled.

As explained thus far, the present invention contemplates generation of a second phase varying signal proportional to the position of the controlled machine tool axis by examining the phase variations of a position transducer having a relatively small scale. It will be apparent that these two phase varying signals may have a significantly different scale factor, as for example in the present embodiment, a difference of 1,000:1. In such a system, it is conventional to control the travel of the machine tool for a significant portion thereof by examining the phase of the phase varying signal having the largest scale factor. However, at some point, it is necessary to shift control of the machine over to the phase varying signal having the smallest scale factor (e.g., the position transducer in the present embodiment). It is therefore important to assure that this transition takes place smoothly and without ambiguities as may result when the scale factors of the two signals are significantly different.

The present invention accommodates both of these needs by providing a novel discriminator system which examines these two phase varying position signals and continuously controls the movement of the machine tool as a result of these examinations. In brief, this is accomplished by including a pair of frequency dividers in the discriminator system. The frequency dividers change the basic frequency (and therefore the effective scale factor) of the phase varying signals having the lowest scale factor so as to provide for an extended range of discrimination which exceeds the scale factor. In this way, the effective range of the discriminator at the lower end is increased by the amount of the frequency division. In addition, the present discriminator system also has the novel advantage of performing the examination of these phase varying signals at the basic frequency of the signals rather than comparing them at the reduced frequency which results from the frequency division.

The operation of the logic diagram of FIG. 6 will now be explained in detail, assuming that the position of the controlled axis is initially more than plus or minus 0.350 inch from the desired position. In this case, the controlled axis, per FIG. 7, will initially travel at 100 percent speed under the exclusive control of the coarse comparator 88. The first thing which must be determined is the direction in which the machine axis is to travel in order to reach the desired position. This is determined by the direction sequence flip-flop 160 operating in conjunction with the direction sign flip-flop 162. The direction sequences flip-flop 160 is self-steered to set and reset. The output of the coarse command phase counter 76 of FIG. 3 is connected to the set trigger input whereas the output of the variable phase counter 86 of FIG. 3 is connected to the reset trigger input. Flip-flop 162 is steered by the outputs of flip-flop 160 in such a fashion that flip-flop 162 will assume the same state as flip-flop 160 when it is triggered. The signal used to trigger (both set and reset trigger) flip-flop 162 is generated by the frequency divider 72 of FIG. 3 and labeled PDP. The signal PDP has the characteristics shown in FIG. 6 in that it goes from logic "0" to logic "1" at the 0 point of the reference counter and then goes back to logic "0" at the 10 count of the reference counter.

If the commanded position is more positive than the actual position of the machine, it will be apparent that the coarse command phase counter 76 will be leading in phase relative to the variable phase counter 86. Under these circumstances, flip-flop 160 will set when the coarse command phase counter output goes to logic "0" and will then reset when the output of the variable phase counter 86 goes to logic "0." The next event in sequence is the reference counter going through 0. Ten counts later, the signal PDP goes through logic "0." Therefore, under these circumstances, the direction sign flip-flop 162 will assume the reset state. Thus, so long as the coarse command signal is greater than the actual position of the controlled axis, the direction sign 162 will stay in the reset state.

On the other hand, if the actual commanded position is negative with respect to the actual position of the machine, it will be apparent that the output of the variable phase counter 86 will be leading in phase with respect to the output of the coarse command phase counter 76. Under these circumstances, the direction sequence flip-flop 160 will first be reset by the signal XCP and will then set when the signal XCC goes to logic "0." This will be followed by the reference counter going through 0 and the signal PDP thereafter going to logic "0" which will cause the direction sign flip-flop 162 to assume the set state and stay in the set state so long as the commanded position is less than the actual position of the controlled machine axis. In this way, the state of flip-flop 162 indicates the direction in which the controlled machine axis must be driven. That is, if flip-flop 162 is reset, then the actual position of the machine is negative with respect to the commanded position and the current fed to the drive motor 86 of FIG. 3 must be positive in order to move the controlled machine axis in the direction necessary to arrive at the desired position. Conversely, if the direction sign flip-flop 162 is set, then the actual position of the machine is positive with respect to the commanded position and the current supplied to the drive motor 86 must be negative in order to drive the controlled machine axis to the desired position.

For this reason, the output terminals of flip-flop 162 are connected to gates 164 and 166 which ultimately control the operation of the first DO element 168. For the purposes of the present explanation, it is to be assumed that turning the DO element 168 fully on is equivalent to feeding current to the drive motor sufficient to drive the controlled machine axis at 100 percent speed. Having thus determined the direction in which the drive motor 86 is to rotate, it is now necessary to determine at which speed the motor is to be driven. As pointed out above in the discussion of FIG. 7, if the position error exceeds plus or minus 0.350 inch, then the machine axis is to be driven at 100 percent speed. Therefore, it is necessary to determine whether the position error is within plus or minus 0.350 inch. This is accomplished by flip-flops 170 and 172 and their associated gating.

Briefly, the function of flip-flop 170 is to set up a "large error zone" in a well known fashion as is described in some detail in the above-cited Evans patent. The function of flip-flop 172 is to determine whether or not the actual position of the machine is within the plus or minus 0.350 inch error zone established by flip-flop 170.

Flip-flop 170 has the signal $\overline{XCC995}$ on its set steering input. This signal is derived from the frequency divider 72 of FIG. 3 and is such that it will go to logic "0" when the reference counter is at 995. Since the flip-flop 170 is triggered by the basic 250 kHz clock signal C, it can be seen flip-flop 170 will set when the reference counter is at 996 since the steering on flip-flop 170 must precede the trigger. On the other hand, flip-flop 170 is steered to reset by a signal emanating from gate 174 through inverter 176. The first input to gate 174 is the 1 output terminal of flip-flop 170. The other input is the signal $\overline{XCC002}$. Thus, the first input will go to logic "0" when the flip-flop 170 is in the set state. The signal $\overline{XCC002}$ goes to logic "0" when the reference counter has gone through 0 and counted up to the number 002. In this way, the flip-flop 170 will be steered to reset when the reference counter is at 2 and will reset on the next clock pulse, i.e., when the reference counter is at 003. In this way, flip-flop 170 steers flip-flop 172 to reset for a band equivalent to plus or minus 3 counts or 0.350 inch. Since flip-flop 172 is triggered to set and reset by the output of the variable phase counter 86, it will be apparent that flip-flop 172 will remain in a set state, indicating that the position error is greater than plus or minus 0.350 inch until such time as the position error has decreased to less than plus or minus 0.350 inch at which time flip-flop 172 will assume the reset state. While the plus or minus 3 count range might indicate plus or minus 0.300 inch, the manner in which the XCP signal changes effectively changes the range to plus or minus 0.350 inch.

Since the state of flip-flop 172 determines whether the position error is greater than plus or minus 0.350 inch, it will be apparent that the DO element 168 can be controlled by monitoring the state of flip-flop 172. Thus, when flip-flop 172 is set, it is clear that the DO element 168 should be turned on all the time in order to command 100 percent speed. This is accomplished by gate 178 which has the 0 output terminal of flip-flop 172 connected to one of its inputs. When flip-flop 172 is set, the output of gate 178 will be a logic "0." The output of gate 178 forms one of the inputs to gates 164 and 166. It will be recalled from the discussion above that gates 164 and 166 are connected to the direction sign of flip-flop 162 so as to determine the appropriate direction of the current to be fed from DO element 168. Thus, if the coarse command is greater than the coarse feedback, the direction sign of flip-flop 162 will be reset. This puts the first input to gate 164 at a logic "0." Similarly, if the position error exceeds plus or minus 0.350 inch, then flip-flop 172 will be set so that the second input to gate 164 will also be a logic "0." The output of gate 164 is fed through an inverter 180 to the plus input terminal of DO element 168 so as to turn it on fully positive and supply current to the drive motors which results in 100 percent speed in the positive direction. Similarly, if flip-flop 162 is set, indicating that the coarse feedback is greater than the coarse command, then one of the inputs to gate 166 will be a logic "0" since it is connected to the 1 output of the direction sign flip-flop 162. If the position error still exceeds plus or minus 0.350 inch, then the other input to gate 166 will be a logic "0." Since gate 166 is connected through inverter 182 to the minus terminal of DO element 168, the DO element 168 will be fully turned on in the negative direction so as to supply the necessary current to drive the drive motor at 100 percent speed in the negative direction.

As was explained above, the position error flip-flop 172 will assume the reset state when the actual position of the controlled machine axis is within plus or minus 0.350 inch of the desired position. At this time, the 0 output terminal of flip-flop 172 goes to the logic "0." Since flip-flop 172 has reset, DO element 168 is no longer turned fully on so that the speed of the controlled machine axis will change at approximately plus or minus 0.350 inch as shown in FIG. 7. As can be seen by further reference to FIG. 7, at this point it is desired to reduce the speed of the controlled axis to 20 percent which is done by having DO element 168 on 20 percent of the time. This is accomplished by virtue of the signal illustrated graphically and shown at the second input to gate 178. As illustrated in FIG. 6, the second input to gate 178 can be any signal from the frequency divider 72 of FIG. 3 which has the time relationship shown. That is, the signal must be at logic "1" for 20 percent of the time and at logic "0" for 80 percent of the time. It can be seen by following the gating of the signal forming this second input to gate 178 that the DO element 168 will thereby be turned on for 20 percent of the time and turned off for 80 percent of the time. Therefore, the current will be fed from the DO element 168 to the power amplifiers, etc. for motor 86 for 20 percent of the time and 0 for 80 percent of the time so that the average current fed to the motor 86 is such that the speed of motor 86 (and therefore of the controlled machine axis 82) will be 20 percent of full speed.

As can be seen by reference to FIG. 7, the speed of the controlled machine axis remains at 20 percent of full speed until the position of the controlled machine axis is somewhere less than plus or minus 0.050 inch of the final position. This is determined by the exact coarse position flip-flop 184. The exact coarse position flip-flop 184 is steered to set by the signal $\overline{XCC999}$ which originates in the coarse command phase counter and goes to logic "0" when the coarse command phase counter is at 999. The exact coarse position of flip-flop 184 is triggered by the signal XCP which is the coarse feedback signal from variable phase counter 86. As can be seen, flip-flop 184 will assume the set state only if the phases of the coarse command phase counter 76 and the variable phase counter 86 are the same. If they are not the same, flip-flop 184 will be triggered to reset each time the output of variable phase counter 86 goes to logic "0" since the signal $\overline{XCC999}$ is fed to the reset steering input terminal of flip-flop 184 by inverter 186. Briefly, it will be recalled from the description of the cycle control shown in detail in FIG. 4 that the phase of the variable phase counter 86 may be advanced or retarded at some point prior to a full revolution of a feedback resolver 80. In this way, it can be seen that the phase of the variable phase counter 86 will exactly coincide with the phase of the coarse command phase counter 76 at some point prior to the time when the machine axis 82 reaches its desired final position. The precise point at which this occurs depends upon the time at which the variable phase counter 86 is advanced by the cycle control of FIG. 4; but, for the purposes of the present explanation, it will suffice to show this happening at approximately 0.050 inch from final position.

When the exact coarse position flip-flop 184 sets, the first thing that takes place is the deactivation of DO elements 168. This is accomplished by virtue of the fact that the 0 output terminal of the flip-flop 184 is connected to the enable input terminal of the DO element 168. When flip-flop 184 assumes the set state the output signal on the 0 output terminal goes to logic "1" thereby deactivating DO element 168. At the same time, the 1 output terminal of the exact coarse position flip-flop 184 is connected to the enable input of DO element 188. Since the 1 output terminal of flip-flop 184 goes to logic "0" when flip-flop 184 assumes the set state, it can be seen that DO element 188 will be activated when the exact coarse position flip-flop 184 assumes the set state. At this point in time, the current fed to the motor 86 becomes proportional to the position error as shown in FIG. 7.

The control of the current from DO element 188 during the proportional portion of the operation of the system as shown in FIG. 7 is achieved by three flip-flops. These are the half-frequency command flip-flop 190, the half-frequency feedback flip-flop 192 and the command sequence flip-flop 194 which operate in conjunction with the gating feeding to DO element 188 to generate current pulses which are directly proportional in width (and of the appropriate polarity) to the position error. This is illustrated and can best be explained by referring to the waveforms of FIG. 8.

The half-frequency command flip-flop 190 has the output of the fine command phase counter 78 connected to its set and reset trigger terminals. Since flip-flop 190 is self-steered to set and reset, it is clear that the output of the half-frequency command flip-flop 190 will be synchronized with the fine command phase counter 78 but will be exactly half of the basic frequency output from the fine command phase counter. Whenever new input data is fed to the fine command phase counter, a logic "1" is fed to the direct set terminal of flip-flop 190 so as to preset the half-frequency command flip-flop 190 upon the presence of an odd decimal digit in the least significant digit position of the coarse command phase counter 76 of FIG. 3. After being preset by each new data command, the command phase counters 76 and 78 start counting clock signals in synchronism with a 125 Hz starting synchronizing signal from the frequency divider 72. Similarly, the half-frequency feedback flip-flop 192 has the fine feedback signal $\overline{XFP}$ from the resolver 80 of FIG. 3 connected to its set and reset trigger terminals. Flip-flop 192 is also self-steered to set and reset so that its output will be synchronous with, but exactly one-half the frequency of, the fine feedback signal from the resolver 80 of FIG. 3. As will subsequently be seen by referring to the waveforms of FIG. 8, the singular advantage of the half-frequency approach of FIG. 6 is that it allows the proportional portion of the speed characteristic shown in FIG. 7 to exceed one full revolution of the resolver 80. In this way, the position control system is less susceptible to phasing problems which would otherwise occur if the proportional zone were sampled by the normal 250 Hz command and feedback signals.

The command sequence flip-flop 194 is also self-steered to set and reset. The output of the fine command phase counter is fed to the set trigger terminal whereas the output of the resolver 80 is fed to the reset trigger terminal. In this way, the command sequence flip-flop 194 will set each time the output of the fine command phase counter goes to logic "0" and reset each time the feedback signal XFP from the resolver 80 goes to logic "0."

The 1 output terminal of the half-frequency command flip-flop 190 forms the first input to a gate 196. The other input to gate 196 comes from the 0 output terminal of the half-frequency feedback flip-flop 192. Similarly, the 0 output terminal of the half-frequency command flip-flop 190 is connected to one input of gate 198. The second input to gate 198 comes from the 1 output terminal of the half-frequency feedback flip-flop 192. The outputs of gates 196 and 198 form first and second inputs to gate 200. Gate 200 has its output connected to one of the inputs to gates 202 and 204. The second input to gate 202 is connected to the 1 output terminal of the command sequence flip-flop 194 whereas the second input to gate 204 is connected to the 0 output terminal of flip-flop 194. Finally, the outputs of gates 202 and 204 are fed through inverters 206 and 208 respectively to the plus and minus terminals of DO element 188.

Figure 8:
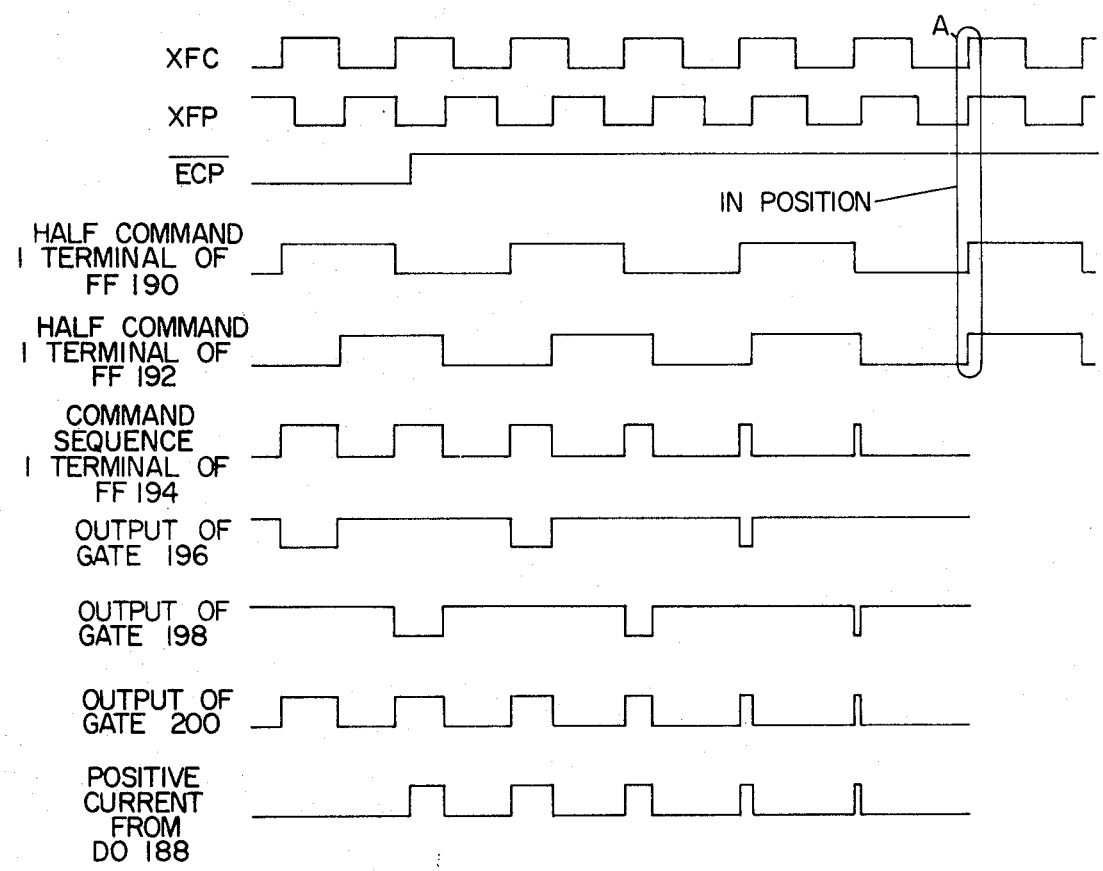

Referring now to FIG. 8, the operation of the proportional portion of the phase comparator of FIG. 6 will be shown in detail. At the top of FIG. 8 there is shown the output of the fine command phase counter XFC. This signal is a constant frequency 250 Hz signal whose phase is proportional to the last three digits of the commanded machine position. The second waveform shown in FIG. 8 is the output of the resolver 80 which is the feedback signal XFP. This signal begins at a frequency which is somewhat greater than the fine command phase counter output since the resolver 80 is rotating thereby making the output of the resolver a frequency higher than the basic 250 Hz excitation frequency. Note that as the controlled machine axis approaches the final desired position, the frequency of signal XFP decreases until finally the controlled machine axis is at the final desired position.

The fact that the controlled machine axis is at the final desired position is noted by comparing the phase of the fine command phase counter output XFC with the fine feedback signal XFP. When these two signals are precisely in phase, the controlled machine axis is "in position" as illustrated at A in these waveforms on FIG. 8. The operation and construction of the "in position" monitoring circuitry is not shown since systems of this type are well known in the prior art and can take any of several forms.

As can be seen in FIG. 8, at some point prior to arriving at the final desired position the exact coarse position flip-flop 184 of FIG. 6 will assume the set state. This is illustrated by the signal $\overline{ECP}$ of FIG. 8 which goes to logic "0" when the controlled machine axis is approximately 0.050 inch from final position as indicated by the relative positions of the waveforms XFC and XFP at the point in time when signal $\overline{ECP}$ goes to logic "0." As was pointed out above, when the exact coarse position flip-flop 184 sets, the output of the DO element 188 is proportional to the phase difference between the command and feedback signals.

The operation of the half-frequency command flip-flop 190 and the half-frequency feedback flip-flop 192 of FIG. 6 is next illustrated in the waveforms of FIG. 8. As can be seen from these waveforms, the signals which are fed from these flip-flops to their associated gatings are precisely in phase relationship with the fine command and fine feedback signals XCC and XFP, and are exactly one-half their frequency. Next, the waveforms of FIG. 8 illustrate the operation of the command sequence flip-flop 194. As pointed out above, command sequence flip-flop 194 sets each time the output of the command phase counter 78 of FIG. 3 goes to logic "0" and resets each time the feedback signal from the resolver 80 goes to logic "0." As was pointed out above, the 1 output terminal of the half-frequency command flip-flop 190 forms one input to gate 196. The other input to gate 196 is the 0 output terminal of half-frequency flip-flop 192. Referring to the waveform entitled "Output of Gate 196" it will be apparent that the output of gate 196 will be a logic "1" when the half-frequency command flip-flop 190 is set and the half-frequency feedback flip-flop 192 is reset. Similarly, gate 198 has the 0 output terminal of the half-frequency command flip-flop 190 as one of its inputs and the 1 output terminal of the half-frequency feedback flip-flop 192 as its other input. Thus, the output of gate 198, as illustrated in FIG. 8, goes to logic "1" when the half-frequency feedback flip-flop 192 is set and the half-frequency command flip-flop 190 is reset. Since both of these gates have their outputs connected to gate 200, it will be apparent that the output of gate 200 will go to logic "0" when either the output of gate 196 is a logic "1" or the output of gate 198 is a logic "1." This is illustrated by the waveform labeled "Output of Gate 200".

Finally, since the output of gate 200 is fed to one input on each of two gates 202 and 204, it will be apparent that the control of the DO element 188 is a function of the output of gate 200 plus the present state of the command sequence flip-flop 194. Therefore, it can be seen that the positive current from DO element 188 will have the characteristic shown in the last waveform of FIG. 8 by comparing the waveforms entitled "Output of Gate 200" with the waveform entitled "Command Sequence 1 Terminal of FF194."

Examination of the waveform entitled "Positive Current from DO 188" shows that the positive current pulses fed from DO element 188 to the power amplifiers, etc. which ultimately feed to the controlled motor 86, decrease in width as the machine axis approaches the final desired position. In this way, the speed of the motor 86 is proportionally reduced as the machine approaches final position so that the speed is proportional to the position error as shown in FIG. 7.

Although the present invention has been described with respect to a particular embodiment, the principles underlining this invention will suggest many additional modifications of this particular embodiment to those skilled in the art. Therefore, it is intended that the appended claims shall not be limited to the specific embodiments shown, but rather shall cover all such modifications as fall within the true spirit and scope of the present invention.

What is claimed as new and desired to be secured by Letters Patent of the United States is:

1. A numerical positioning control system for controlling the position of at least one axis of a machine comprising:
    a. a source of input data for providing a command signal indicative of the desired position of the controlled machine axis;
    b. means for generating a first relatively high frequency reference signal for synchronizing the operation of the system;
    c. first and second digital counters operatively connected to said first signal means to be counted thereby so as to supply first and second time varying digital signals;
    d. means for feeding said input data to said first and second counters so as to preset said counters to numbers proportional to said input data;
    e. a single position transducer operatively connected to said reference signal means and mechanically coupled to the controlled machine axis so as to be excited by said reference signal means and operative to generate a phase varying signal indicative of the position of said controlled axis;
    f. phase varying means operatively connected to said position transducer for generating a second phase varying signal having a scale factor greater than the scale factor of said position transducer;
    g. a first comparator operatively connected to said first counter and said phase varying means to generate a signal indicative of the phase difference between the outputs of said first counter and said phase varying means;
    h. a second comparator operatively connected to said second counter and to said position transducer operative to generate a signal indicative of the phase difference between the outputs of said second counter and said position transducer; and,
    i. driving means operatively connected to said first and second comparators and being operative to move said controlled machine axis in accordance with the outputs of said first and second comparators.

2. The numerical positioning control system recited in claim 1 further comprising cycle control means operatively connected to said position transducer for generating a digital pulse indicative of a predetermined amount of travel by the controlled machine axis, the output of said cycle control means being operatively connected to said phase varying means so as to advance or retard the phase thereof.

3. The numerical positioning control system recited in claim 2 wherein said phase varying means comprises a third digital counter operatively connected to said reference signal means and to said cycle control means so as to be counted by said reference signal means and operative to vary in phase in response to output pulses from said cycle control means.

4. The numerical positioning control system recited in claim 3 wherein said cycle control means comprises:
    a. a reversible counter operatively connected to said position transducer and to said reference signal means, said reversible counter being operative to be counted in a first direction by said reference signal and in the opposite direction by the output of said position transducer; and b. monitoring means operatively connected to said reversible counter for monitoring the count stored in said reversible counter and operative to generate a pulse each time the count in said reversible counter exceeds a predetermined number.

5. Digital control means for generating a second phase varying digital signal in response to a first phase varying digital signal, said second digital signal having a scale factor greater than the scale factor of said first digital signal comprising:
 a. means for supplying a reference signal having a frequency proportional to said first digital signal;
 b. a source of said first digital signal comprising a single position transducer whose output signal varies in phase as a function of position;
 c. a reversible counter operatively connected to said source of said first digital signal and to said reference signal means, said reversible counter being operative to be counted in a first direction by said reference signal and in the opposite direction by said first digital signal;
 d. monitoring means operatively connected to said reversible counter for monitoring the count stored in said reversible counter and operative to generate a digital pulse each time the count exceeds a predetermined number; and
 e. a digital counter operatively connected to said reference signal means and said monitoring means, said digital counter being operative so as to be counted by said reference signal and further operative to be phase varied in response to pulses from said monitoring means.

6. The digital control means recited in claim 5 further comprising means for connecting the output of said monitoring means to said reversible counter so as to count said reversible counter.

7. A method of controlling the position of at least one axis of a machine comprising the steps of:
 a. providing input data indicative of the desired position of the controlled machine axis;
 b. feeding said input data to first and second counters so as to preset said counters to numbers proportional to the input data;
 c. generating a first relatively high frequency reference signal for synchronizing the operation of the numerical positioning control system;
 d. generating first and second time varying digital signals by counting said first and second counters with said reference signal;
 e. exciting a single position transducer with a signal proportional to said reference signal and monitoring the output of said position transducer to generate a first phase varying signal indicative over a limited range of the position of the controlled machine axis;
 f. generating a second phase varying signal having a scale factor larger than the scale factor of said first phase varying signal, the phase of said second phase varying signal being derived from said first phase varying signal;
 g. comparing said second phase varying signal with the output of said first time varying digital signal;
 h. comparing said first phase varying signal with said second time varying signal; and
 i. moving the controlled machine axis in a direction and at a speed indicated by said comparisons.

8. A phase discriminator for generating output signals indicative of the phase difference between two phase varying signals comprising:
 a. first means for generating a first phase varying signal having a first basic frequency comprising a single position transducer operatively connected to one axis of a controlled machine tool so as to indicate the position thereof;
 b. second means for generating a second phase varying signal having the same basic frequency as said first phase varying signal and indicative of the desired position of said controlled machine tool axis;
 c. a first frequency divider operatively connected to said first means for generating a third phase varying signal proportional to said first phase varying signal;
 d. a second frequency divider operatively connected to said second means for generating a fourth phase varying signal proportional to said second phase varying signal;
 e. first phase comparing means operatively connected to said first and second means for generating an output signal proportional to the phase difference between said first and second phase varying signals; and
 f. second phase comparing means operatively connected to said first and second frequency dividers and to the output of said first phase comparing means for generating an output signal proportional to the phase difference between said third and fourth phase varying signals at the rate determined by the basic frequency of said output signal from said first phase comparing means.

9. The phase discriminator recited in claim 8 further comprising a pulse width-to-current converter operatively connected to the output of said second phase comparing means for generating current pulses proportional to the width of said output signal from said second phase comparing means.

10. A discriminator system for generating an output signal representative of the position error of at least one axis of a controlled machine tool comprising:
 a. first and second phase varying means for generating first and second phase varying digital signals having different scale factors and being indicative of the desired position of said controlled machine tool axis;
 b. a single position transducer operatively connected to said controlled machine tool axis for generating a third phase varying signal having a scale factor corresponding to the scale factor of said first phase varying signal, said third phase varying signal being indicative of the actual position of said controlled machine tool axis;
 c. means for generating a fourth phase varying digital signal indicative of the actual position of said controlled machine tool axis and having a scale factor corresponding to the scale factor of said second phase varying digital signal;
 d. first zone detecting means operatively connected to said second phase varying means and to said means for generating said fourth phase varying signal being operative to generate an output signal when said position error exceeds a first predetermined amount;

e. a first pulse width-to-current converter operatively connected to said first zone detecting means and to said second phase varying means and said means for generating said fourth phase varying signal and being operative to generate an output current which is a function of the phase difference between said second and fourth phase varying signals in response to said output signal from said first zone detecting means;

f. second zone detecting means operatively connected to said second phase varying means and to said means for generating said fourth phase varying signal and being operative to generate an output signal when said position error is less than a second predetermined amount; and g. a second pulse width-to-current converter operatively connected to said second zone detecting means and to said first phase varying means and said position transducer and being operative to generate an output current proportional to the phase difference between said first and third phase varying signals in response to said output from said second zone detecting means.

11. The discriminator system recited in claim 10 wherein said means for generating said fourth phase varying digital signal comprises a digital counter operatively connected to said position transducer and being operative to be counted by a reference signal so as to generate a phase varying signal whose phase varies as a function of the movement of said position transducer.

12. The discriminator system recited in claim 11 further comprising cycle control means operatively connected to said position transducer for generating a digital pulse indicative of a predetermined amount of travel by the controlled machine tool axis, the output of said cycle control means being operatively connected to said digital counter so as to advance or retard the phase thereof.

13. The discriminator system recited in claim 10 further comprising first and second frequency dividers having their inputs operatively connected to said first phase varying means and said position transducer, respectively, and their outputs operatively connected to said second pulse width-to-current converter.

* * * * *